United States Patent [19]

Kanazawa

[11] Patent Number: 5,126,899
[45] Date of Patent: Jun. 30, 1992

[54] MANUAL/AUTOMATIC LOADING/UNLOADING APPARATUS

[75] Inventor: Hiroshi Kanazawa, Tokyo, Japan

[73] Assignee: Asahi Kogaku Kogyo Kabushiki Kaisha, Tokyo, Japan

[21] Appl. No.: 436,051

[22] Filed: Nov. 14, 1989

[30] Foreign Application Priority Data

Nov. 14, 1988 [JP] Japan .................. 63-287411

[51] Int. Cl.⁵ .................. G11B 5/016; G11B 17/04; G11B 33/02
[52] U.S. Cl. .................. 360/99.07; 360/99.06; 360/99.02; 360/96.5; 369/77.2
[58] Field of Search .............. 360/99.02, 99.03, 99.06, 360/99.07, 96.5; 369/77.1, 77.2

[56] References Cited

U.S. PATENT DOCUMENTS

| | | | |
|---|---|---|---|
| 4,707,819 | 11/1987 | Ehara | 360/99.06 |
| 4,786,998 | 11/1988 | Sugawara et al. | 360/99.06 |
| 4,862,445 | 8/1989 | Sasaki | 369/75.2 |
| 4,945,433 | 7/1990 | Suzuki et al. | 360/99.07 |

Primary Examiner—A. J. Heinz
Assistant Examiner—Jefferson Evans
Attorney, Agent, or Firm—Sandler, Greenblum & Bernstein

[57] ABSTRACT

A cam plate is driven by a motor for loading a recording medium. Because the cam plate is separated from the motor rotation when the recording medium is in a recording and/or playback position, manual unloading can be performed at the time of stoppage of electric power supply and also the motor loading and unloading can be done when the electric power is supplied.

11 Claims, 32 Drawing Sheets

MANUAL/AUTOMATIC LOADING/UNLOADING APPARATUS

BACKGROUND OF THE INVENTION

This invention relates to a loading apparatus which is advantageous for use in an optical disk apparatus, video tape recorder, video disk player, compact disk player and similar devices.

In an optical disk apparatus, video tape recorder, video disk player, compact disk player and and similar devices, a disk or magnetic tape serving as a recording medium, or a cartridge (cassette) storing the recording medium therein is loaded from a setting position to a recording and/or playback position (a loaded position) and unloaded from the recording and/or playback position to the setting position after completion of recording and/or playback. In the prior art this loading (unloading) has been performed by a motor.

An apparatus which executes the loading by the motor has an advantage in use because the force for pushing and inserting a cartridge into an insertion opening of the apparatus can be small, but it has a disadvantage that the motor can not be rotated and unloading can not be accomplished upon failure of the electric power supply.

SUMMARY OF THE INVENTION

An object of this invention is to provide a loading apparatus which can unload a recording medium or a cartridge having the recording medium therein with ease and reliability in spite of the stoppage of the electric power supply.

According to this invention, there is provided a loading apparatus comprising a moving mechanism for moving a recording medium between two specific positions to load and unload the recording medium;

a motor that is activated and rotated at the time of loading and unloading;

a transmission mechanism for transmitting the motor rotation to the moving mechanism so that the transmission of the motor rotation is inhibited when the moving mechanism is in one of the two specific positions; and an operating device which can be manually operated for unloading at least at the time of a stoppage of the electric power supply.

The rotation of motor is transmitted through the transmission mechanism to the moving mechanism. However, the transmission of the rotation is inhibited when the moving mechanism in a specific position. Therefore, when the stoppage of the electric power supply occurs while the moving mechanism is in a specific position, the moving mechanism can be moved to another position by the manual operation of the operating device.

Accordingly, the problem that unloading can not be performed owing to the stoppage of the electric power supply is eliminated.

DETAILED DESCRIPTION OF THE PREFERRED EMBODIMENT

FIGS. 1 to 12 show structure of an optical disk apparatus according to this invention.

Figure 8:
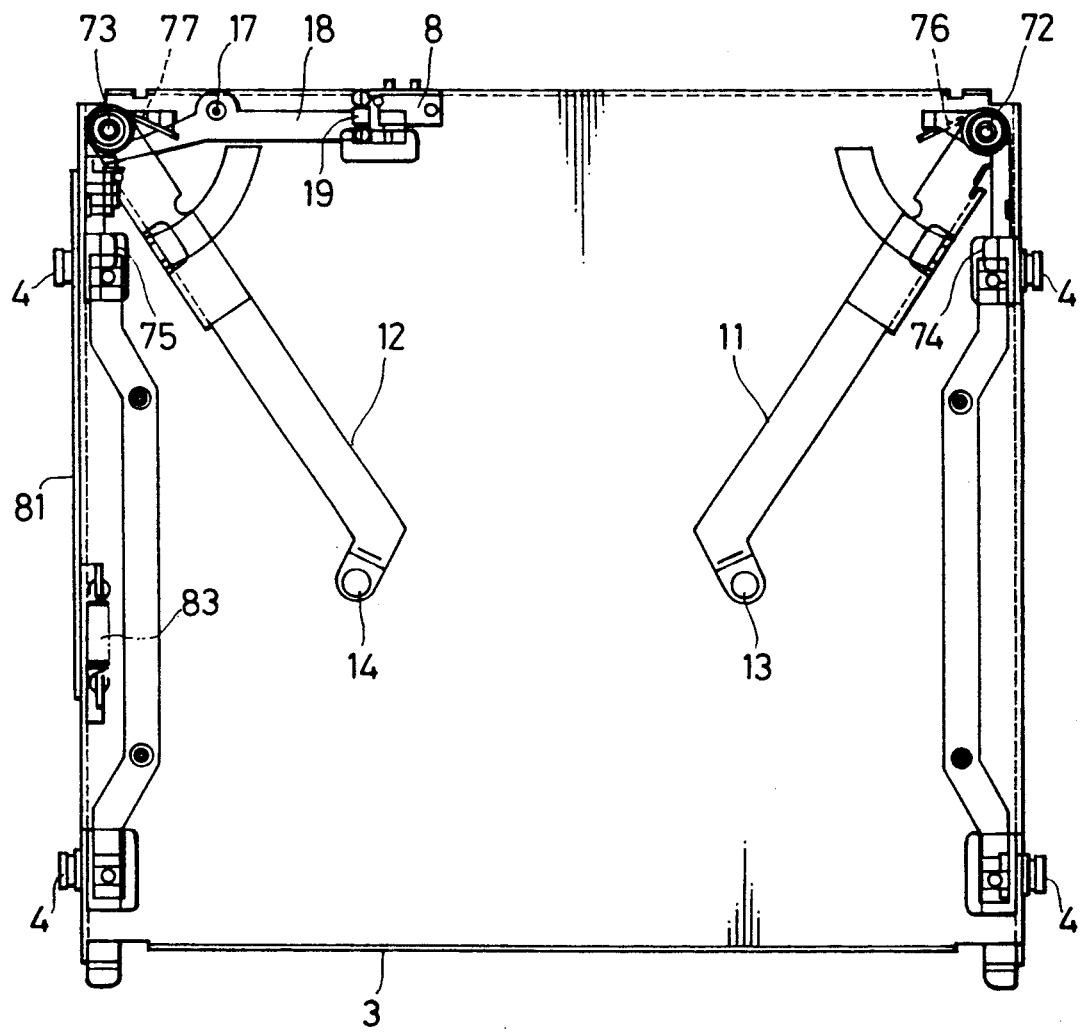
FIG. 8 is a plan view showing a holder in a loading apparatus according to this invention.
Figure 9:
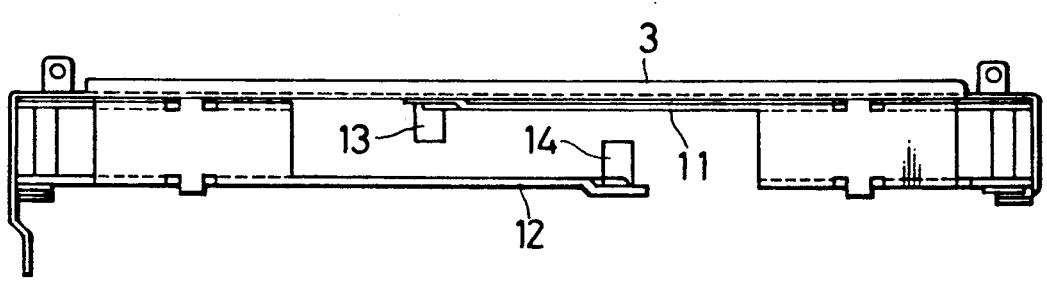
FIG. 9 is a front view showing a holder in a loading apparatus according to this invention.

A front surface and periphery of a chassis 1 have a front panel 15 and housing 16, respectively. The front panel 15 has an insertion opening 2 for inserting a cartridge. A holder 3 for holding the cartridge is supported on chassis 1 to be able to slide back and forth (in a vertical direction in FIG. 2 and in a horizontal direction in FIG. 3). The holder 3 is pulled by a spring 70 on the chassis 1 in a forward direction (in a downward direction in FIG. 2). A stud 4 mounted on the holder 3 is engaged with a slant cam 6 of a cam plate 5 supported to be able to slide on the chassis 1 and with each cam 7 formed on the right and left side walls of the chassis 1 in a shape of a letter L. A microswitch 8 is fixed on the holder 3 so that the microswitch 8 is pressed by an arm 18 rotatably supported on the holder 3 through a stud 17 (FIG. 8). The arm 18 is pulled by a spring 19 in a counterclockwise direction in FIG. 8. A slot 9 is formed on the cam plate 5 and a stud 10 mounted on the chassis 1 is inserted in the slot 9.

Arms 11 and 12 are rotatably supported on studs 72 and 73 on the holder 3. At the ends of arms 11 and 12 projections 13 and 14 are formed. Cartridge lock arms 74 and 75 are rotatably supported on studs 72 and 73 on the holder 3. Springs 76 and 77 are located between the arm 11 and cartridge lock arm 74 and between the arm 12 and cartridge lock arm 75, respectively.

A gear box 21 which includes gears rotated by a motor 30 is provided for loading. The rotation of the motor 30 is transmitted from the gear box 21 to gear 22 which is part of a transmission means and has a stud 23. The stud 23 of gear 22 can be inserted in a groove 24 formed on the cam plate 5. Gears 27 fixed on both sides of a shaft 26 rotatably supported on the chassis 1 engage with racks 25 fixed on the cam plates 5. By this arrangement the cam plates 5 located in right and left sides can move in synchronism with each other. A microswitch 28 which is mounted on the chassis 1 and is turned ON or OFF by a stopper 52 rotatably supported on a stud 51 on the chassis 1. The stopper 52 is pulled by a spring 53 in a counterclockwise direction in FIG. 3. A recess 54 is formed on the stopper 52 so that the stud 23 can come in contact with the recess 54.

Figure 4:
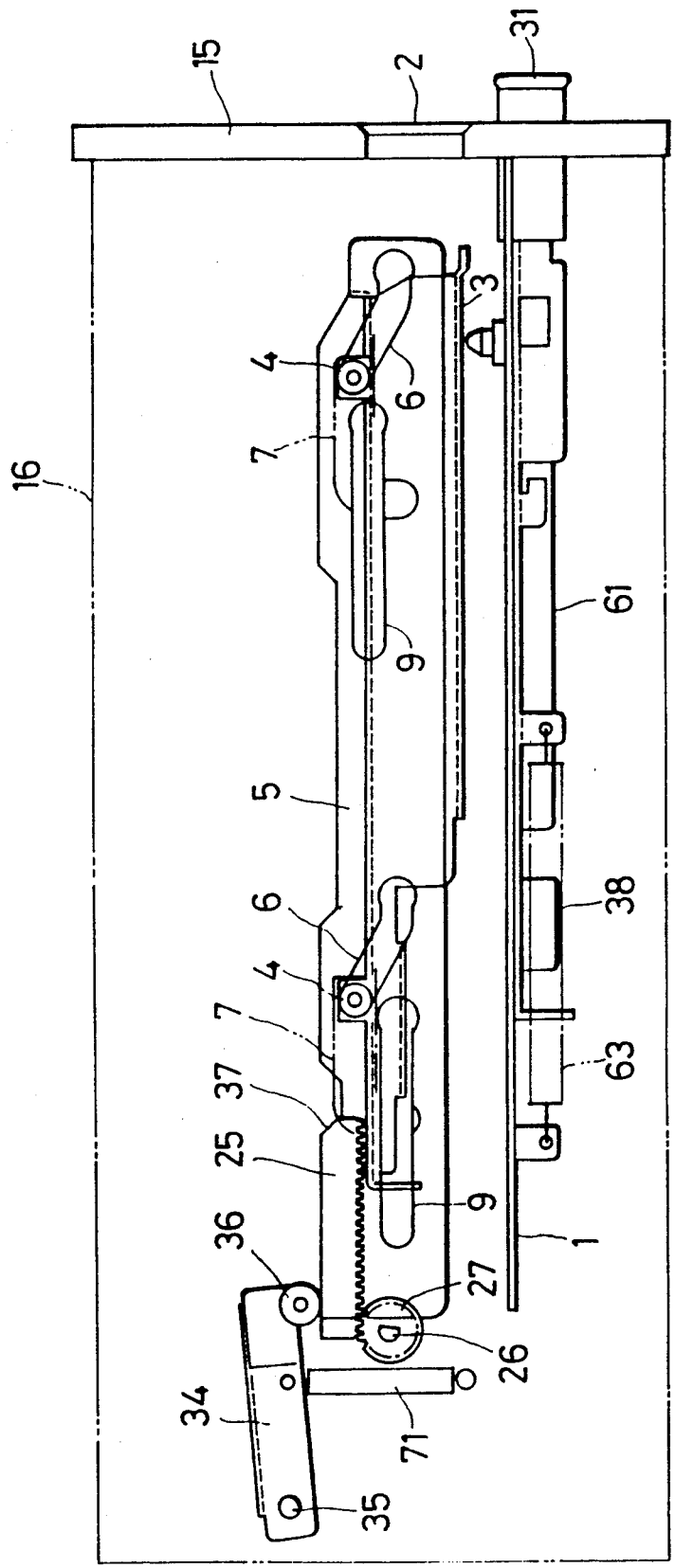
FIG. 4 is a left side view showing a loading apparatus according to this invention in a state where a cartridge is not inserted in the loading apparatus.
Figure 5:
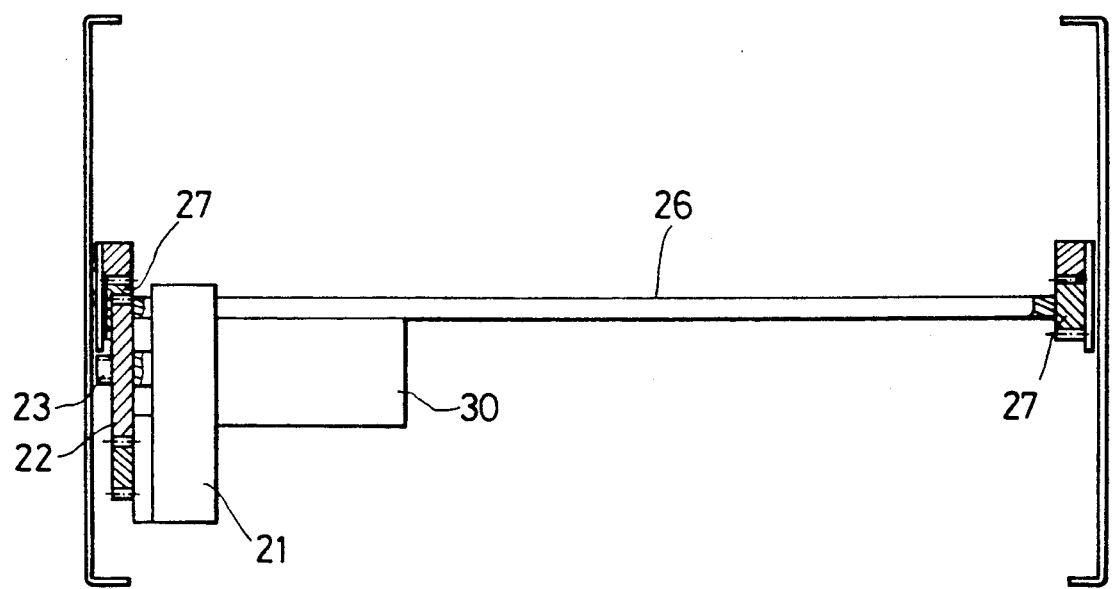
FIG. 5 is a rear view showing a loading apparatus according to this invention in a state where the electric power is supplied.

An arm 34 is rotatably supported on a stud 35 on the chassis 1 and is pulled by a spring 71 in a clockwise direction in FIG. 4. A roller 36 is rotatably mounted on the end of arm 34 and pressed on the upper edge of cam plate 5 so that the roller 36 can engage with a cam 37 plate 5 thereof.

Figure 6:
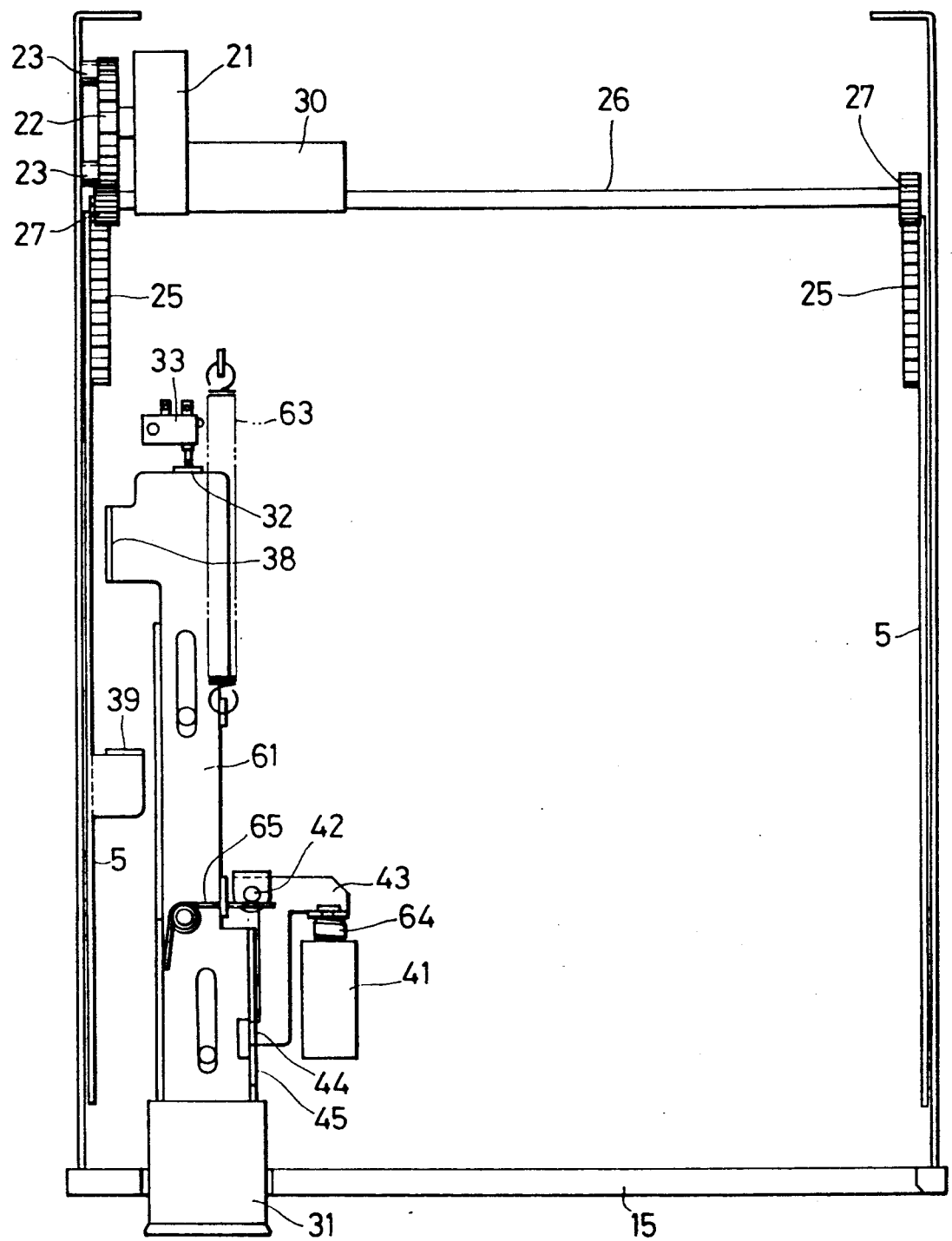
FIG. 6 is a bottom view showing a loading apparatus according to this invention in a state where the electric power is supplied.
Figure 7:
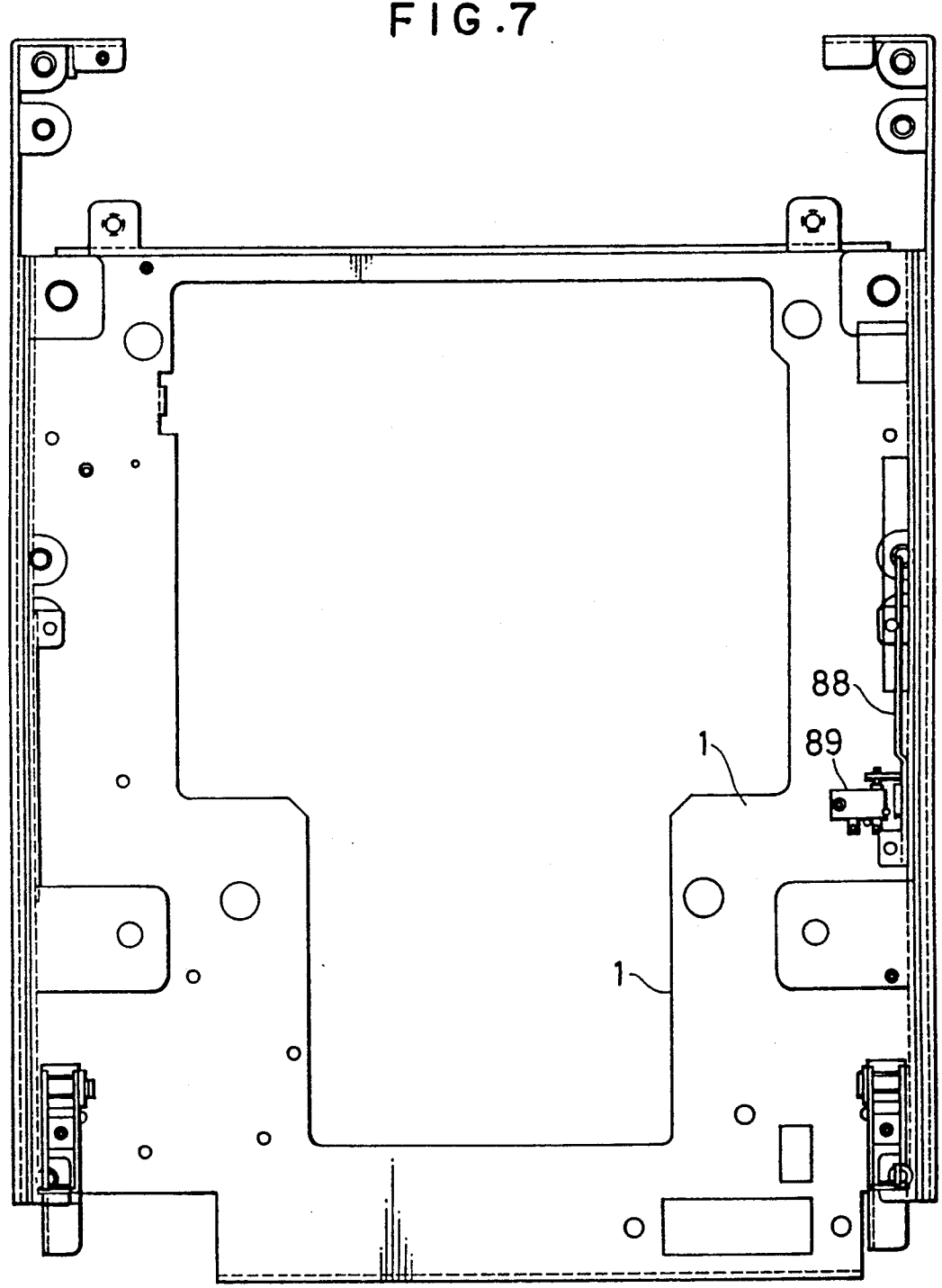
FIG. 7 is another plan view showing a loading apparatus according to this invention in a state where the electric power is supplied.

An eject button 31 is fixed on an end of a plate 61 which is mounted to be able to slide back and forth (up and down in FIG. 6). A pressure portion 32 is formed on the other end of plate 61 and turns a microswitch 33 ON mounted on the chassis 1. A projection 38 can engage with a projection 39 of the cam plate 5. A spring 63 pulls the plate 61 in an upward direction in FIG. 6.

When activated, a plunger 41 rotates an arm 43 which is rotatably mounted on a stud 42 on the chassis 1 in a clockwise direction in FIG. 6. The arm 43 is always pulled by a spring 64 in a counterclockwise direction. A projection 44 is formed on the arm 43 so that the projection 44 can engage with a notch 45 formed on the plate 61. A spring 65 returns the eject button 31 to its original position when the pressure of eject button 31 is removed.

Figure 10:
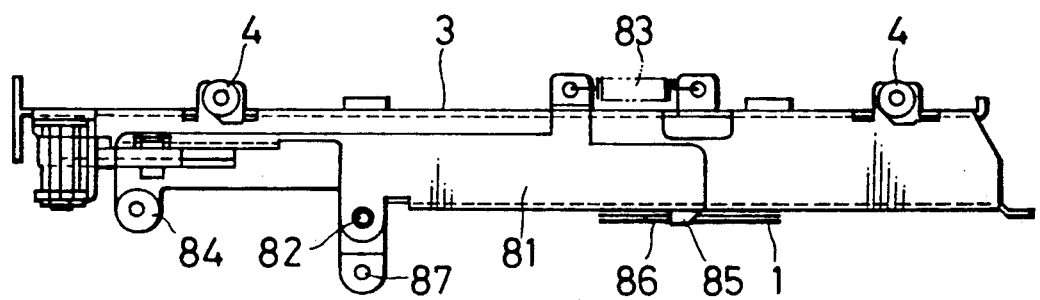
FIG. 10 is a left side view showing a holder in a loading apparatus according to this invention.
Figure 11:
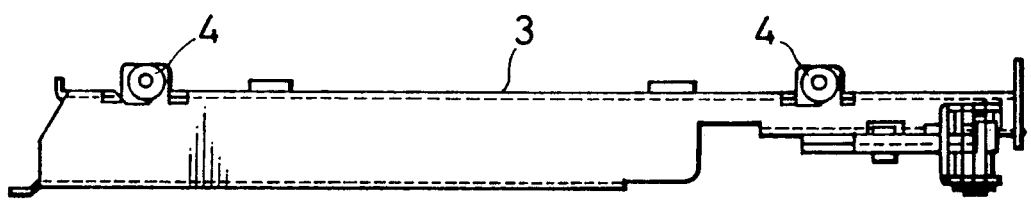
FIG. 11 is a right side view showing a holder in a loading apparatus according to this invention.
Figure 12:
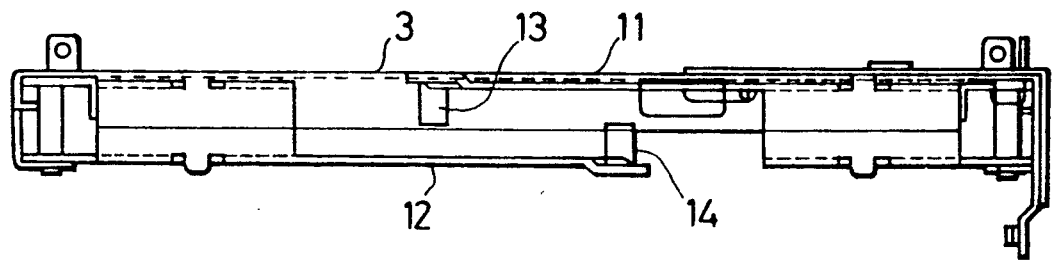
FIG. 12 is a rear side view showing a holder in a loading apparatus according to this invention.

In FIGS. 8 and 10, a holder lock arm 81 is rotatably mounted on a stud 82 on the holder 3 and pulled by a spring 83 in a clockwise direction in FIG. 10. A roller 84 is rotatably supported on the holder lock arm 81 and a projection 85 is formed on the holder lock arm 81 so that the projection 85 can engage with a projection 86 on the chassis 1. A stud 87 formed on the holder 3 is inserted in a slot 92 of a plate 88 mounted to be able to slide on the chassis 1 shown in FIG. 7 so that the stud 87 activates a microswitch 89 through the plate 88.

Figure 13:
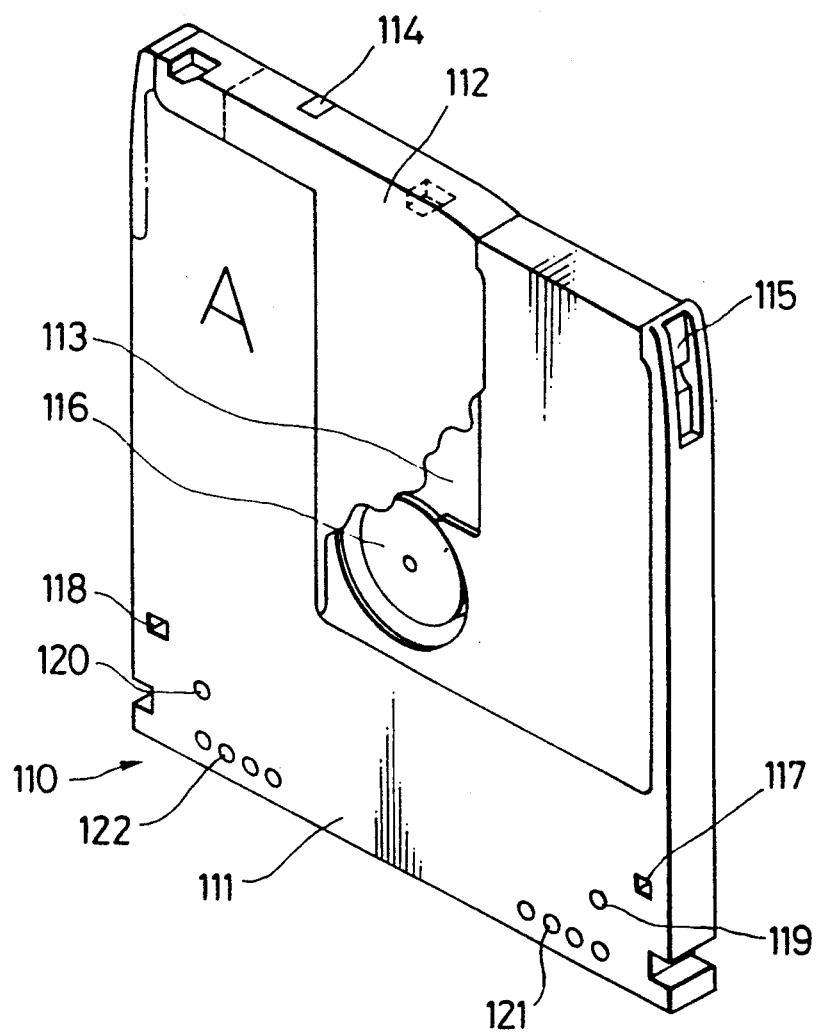
FIG. 13 is a perspective view showing a cartridge to be used in a loading apparatus according to this invention.
Figure 14:
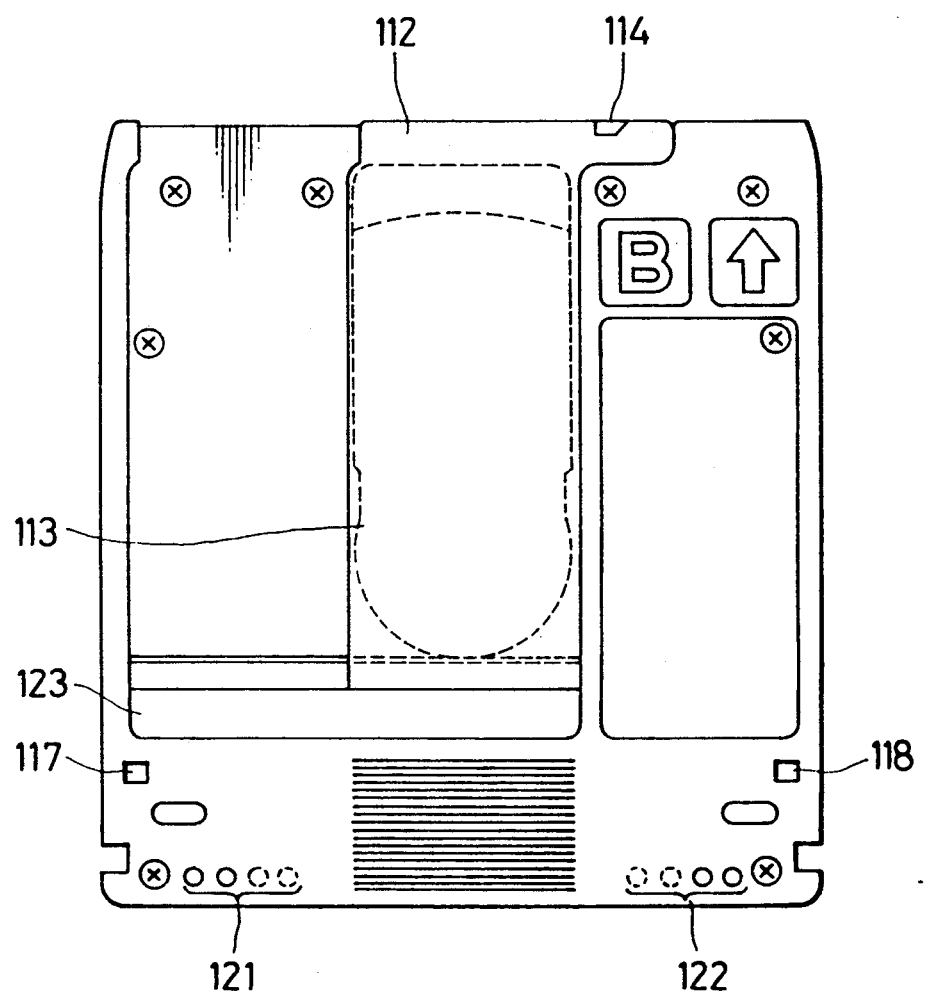
FIG. 14 is a plan view showing a cartridge to be used in a loading apparatus according to this invention.
Figure 15:
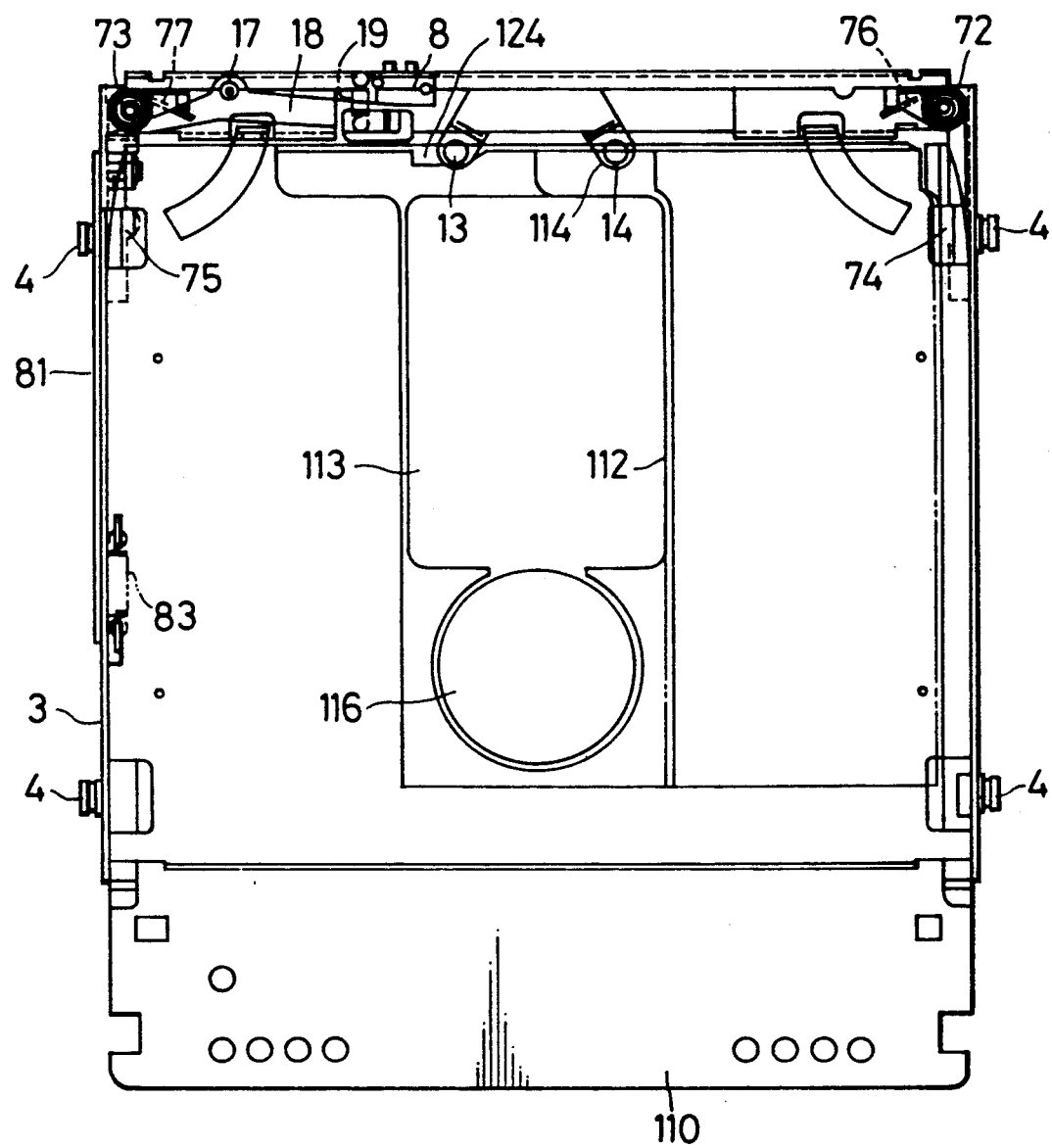
FIG. 15 is a plan view showing a holder according to this invention in a state where a cartridge is set.

FIGS. 13 and 14 show a structure of a cartridge in which an optical disk is enclosed and which is loaded in an optical disk apparatus.

A cartridge 110 comprises essentially a case 111 and a shutter 112 which is able to slide on the case 111. An opening 113 appears when the shutter 112 is opened for a head access to the optical disk enclosed in the cartridge 110. A notch 114 is formed on the shutter 112 for opening and closing it. Grooves 115 for locking are formed on the ends of right and left side walls of the case 111. A hub 116 is for centering and clamping a disk. Holes 117 and 118 are for positioning, holes 119 and 120 are for discrimination of write prohibition modes on faces A and B, and holes 121 and 122 are for discrimination of disk features. A plate 123 is for guiding the slide direction of shutter 112.

Now the operation of the device will be described. When the cartridge 110 in which the optical disk is enclosed is inserted in the insertion opening 2, the projections 13 and 14 which are fixed on the ends of arms 11 and 12 and projecting in a forward direction (a downward direction in FIGS. 2 and 8) come in contact with the front end of cartridge 110. At this time one of the projections 13 and 14 confronts the notch 114 of the shutter 112 according to whether the face A or B of the cartridge 110 is directed up at the time of insertion into the apparatus. Furthermore, when the cartridge 110 is pushed, the arms 11 and 12 are pulled by the springs 76 and 77 so that the projections 13 and 14 project in a forward direction, rotate in a backward direction against the forces by the springs 76 and 77. At the same time the shutter 112 of the cartridge 110 is opened by the projection 13 or 14, and the optical disk enclosed therein appears through the opening 113.

By further pushing of the cartridge 110, since the left and front sides of the cartridge 110 press the left side of the arm 18 in FIG. 8, the arm 18 pivots on the stud 17 in a clockwise direction against the force by the spring 19. Therefore, the microswitch 8 which had been pressed by the arm 18 and had been ON, is now turned OFF. Thereby, the setting of the cartridge 110 is detected. Also at this time, the cartridge lock arms 74 and 75 which are pulled inside by the springs 76 and 77 engage with the grooves 115 of the cartridge 110 and the cartridge 110 is locked. By this way, as shown in FIGS. 15 to 18, the cartridge 110 is held (locked) on the holder 3.

Figure 19:
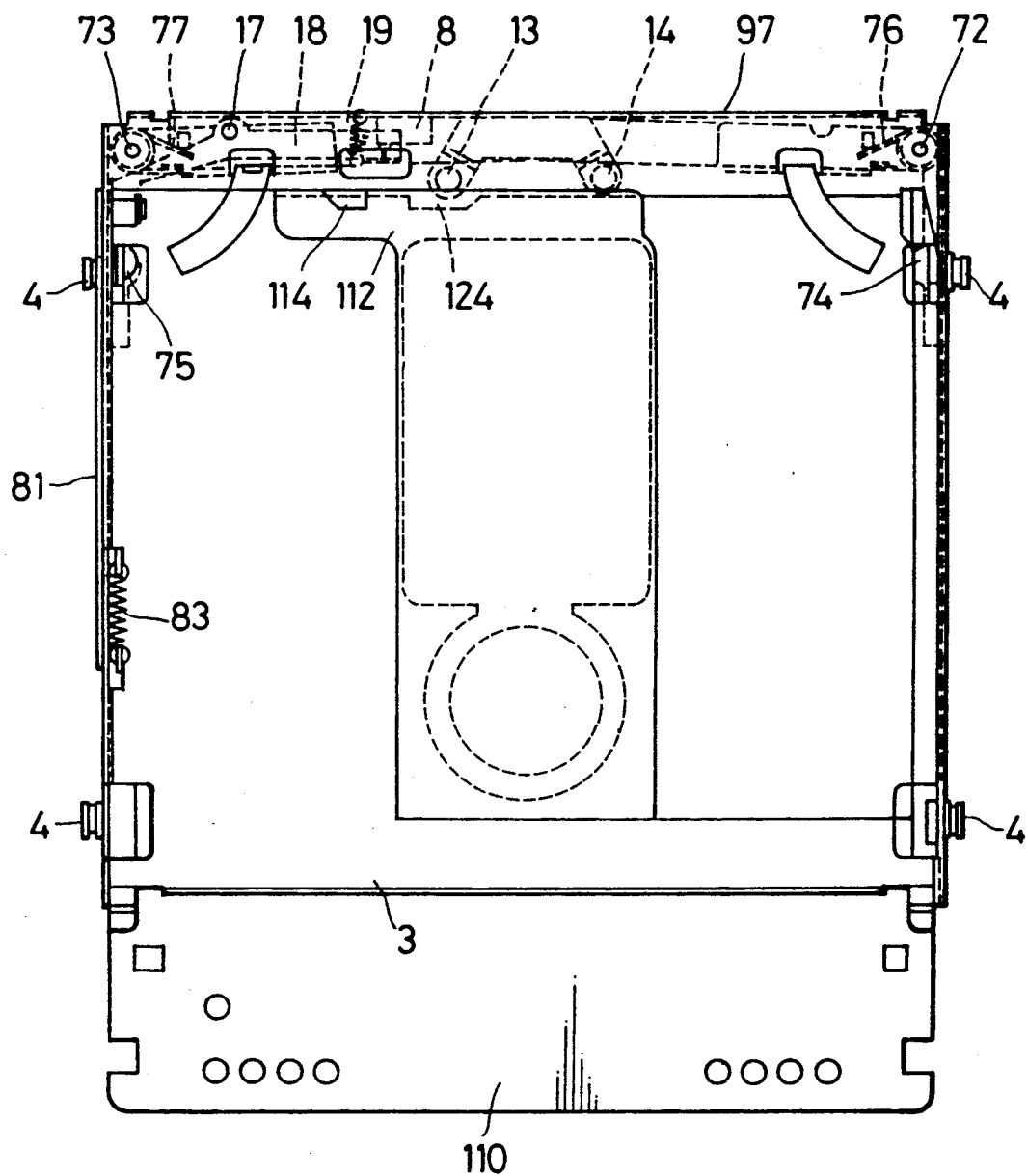
FIG. 19 is a plan view showing a holder according to this invention in a state where a cartridge of which a shutter is not opened is set.

If the shutter 112 of the cartridge 110 was not opened, the projection 13 can not be inserted in the notch 124 of the cartridge 110 as shown in FIG. 19 and the projection 14 can not enter into the notch 114 of the shutter 112. Accordingly, the projections 13 and 14 are pressed by the shutter 112 and the arms 11 and 12 come in contact with a rear end 97 of the holder 3 and can not rotate backward. Therefore, the arm 18 can not be pushed by the cartridge 110 and the microswitch 8 is kept in a state of ON. When the microswitch 8 is ON, the motor 30 can not be activated and the loading can not be performed. Also, since the projection 98 of the cam plate 5 comes in contact with the projection 99 of the stopper 52, the cam plate 5 can not be moved backward.

Figure 20:
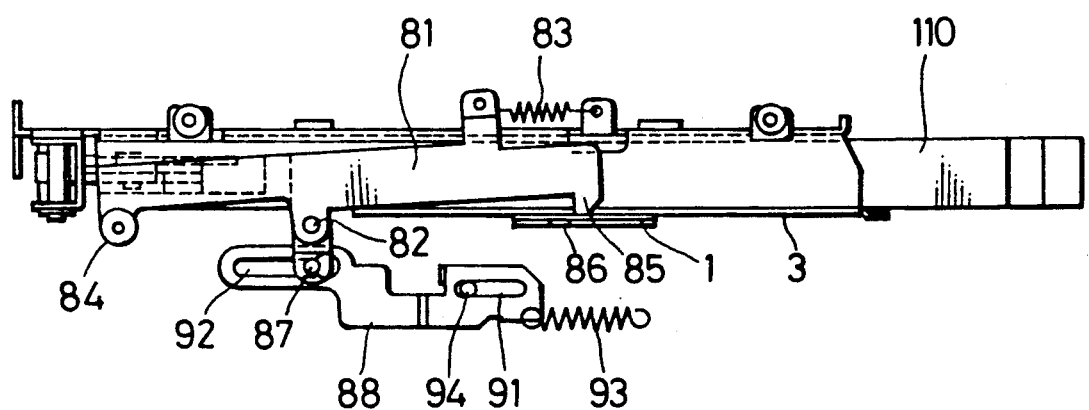
FIG. 20 is a left side view showing a holder according to this invention in a state where a cartridge is set.
Figure 21:
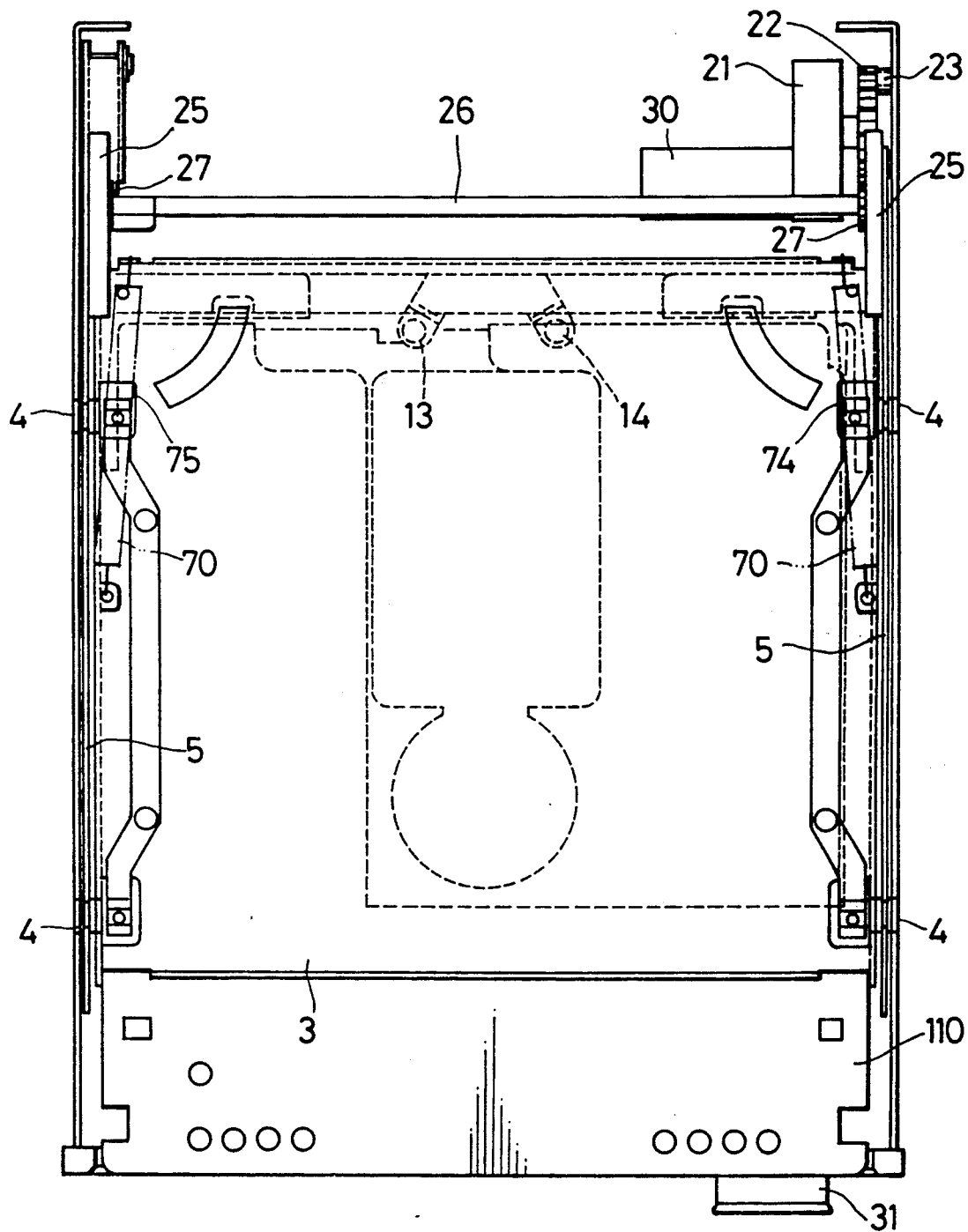
FIG. 21 is a plan view showing a loading apparatus according to this invention at the time of starting motor.

On the other hand, when the cartridge 110 is inserted in a correct way on the holder 3, as shown in FIG. 20, the roller 84 is pressed with by the cartridge 110 and the holder lock arm 81 pivots on the stud 82 in a counterclockwise direction. Therefore, the interlocking between the projection 85 of the holder lock arm 81 and the projection 86 of the chassis 1 is removed and the holder 3 can move left (upward in FIG. 16). Accordingly, when the cartridge 110 is pushed further, the holder 3 holding the cartridge 110 moves backward against the force of the spring 70. At this time the stud 4 of the holder 3 comes in contact with the right side of the cam 6 in FIG. 17 and the cam plate 5 moves to the right together with the holder 3.

Figure 16:
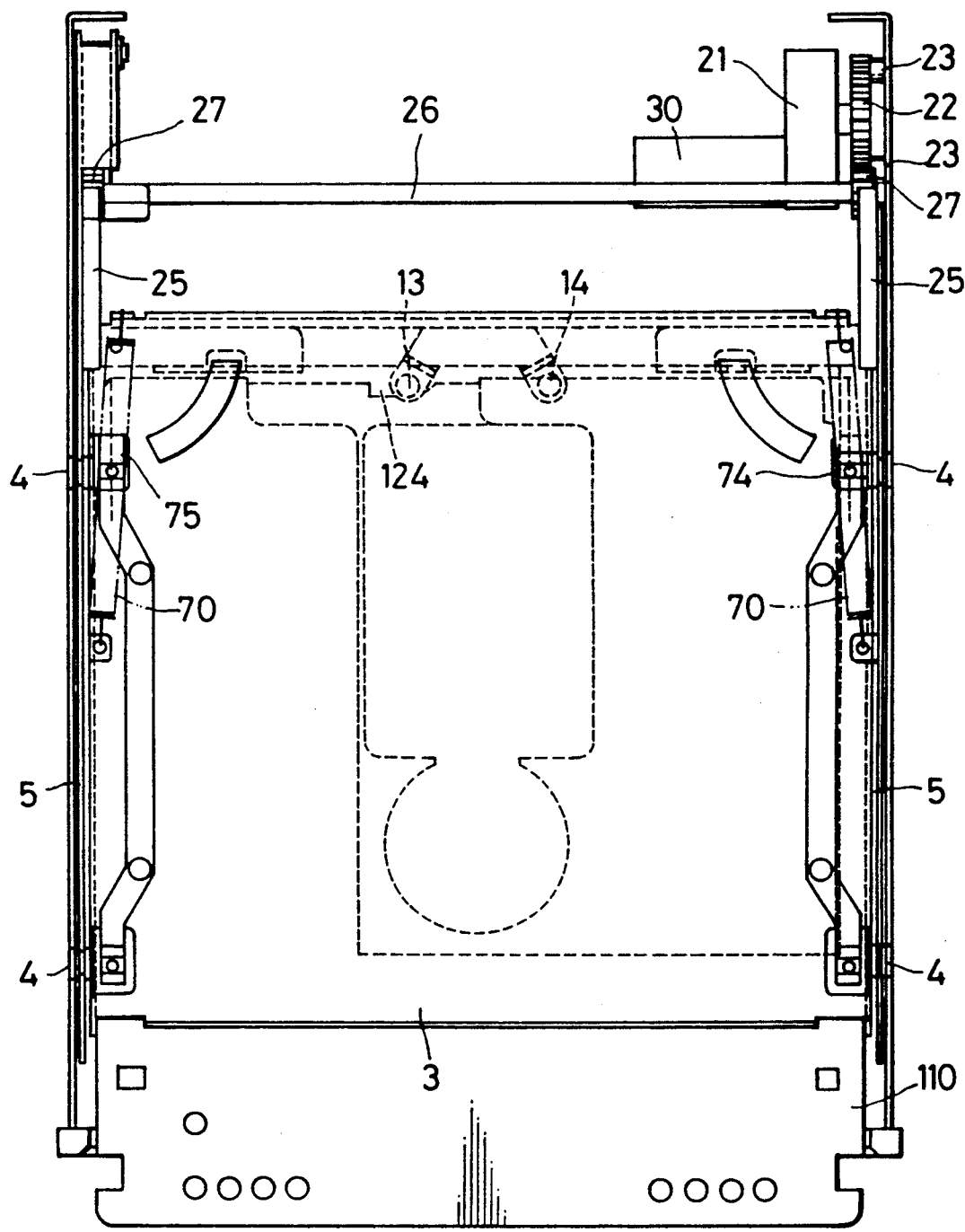
FIG. 16 is a plan view showing a loading apparatus according to this invention in a state where a cartridge is set.

In FIG. 16, when the right cam plate 5 moves, the gear 27 engaging with the rack 25 fixed thereon rotates and the rotation is transmitted through the shaft 26 to the left gear 27. Therefore, the rack 25 and the cam plate 5 on the left side move in synchronism with the rack 25 and the cam plate 5 on the right side.

When the holder 3 reaches a specific position, the stud 87 of the holder 3 shown in FIG. 20 comes in contact with the left end of slot 92 of the plate 88. Therefore, the plate 88 moves left together with the holder 3 against the force of the spring 93 one end of which is fixed on the chassis 1. This movement is guided by the stud 94 mounted on the chassis 1 and the slot 91 of the plate 88 engaging with the stud 94. Thereby, the microswitch 89 shown in FIG. 7 which has been pushed by the plate 88 is turned OFF.

Figure 22:
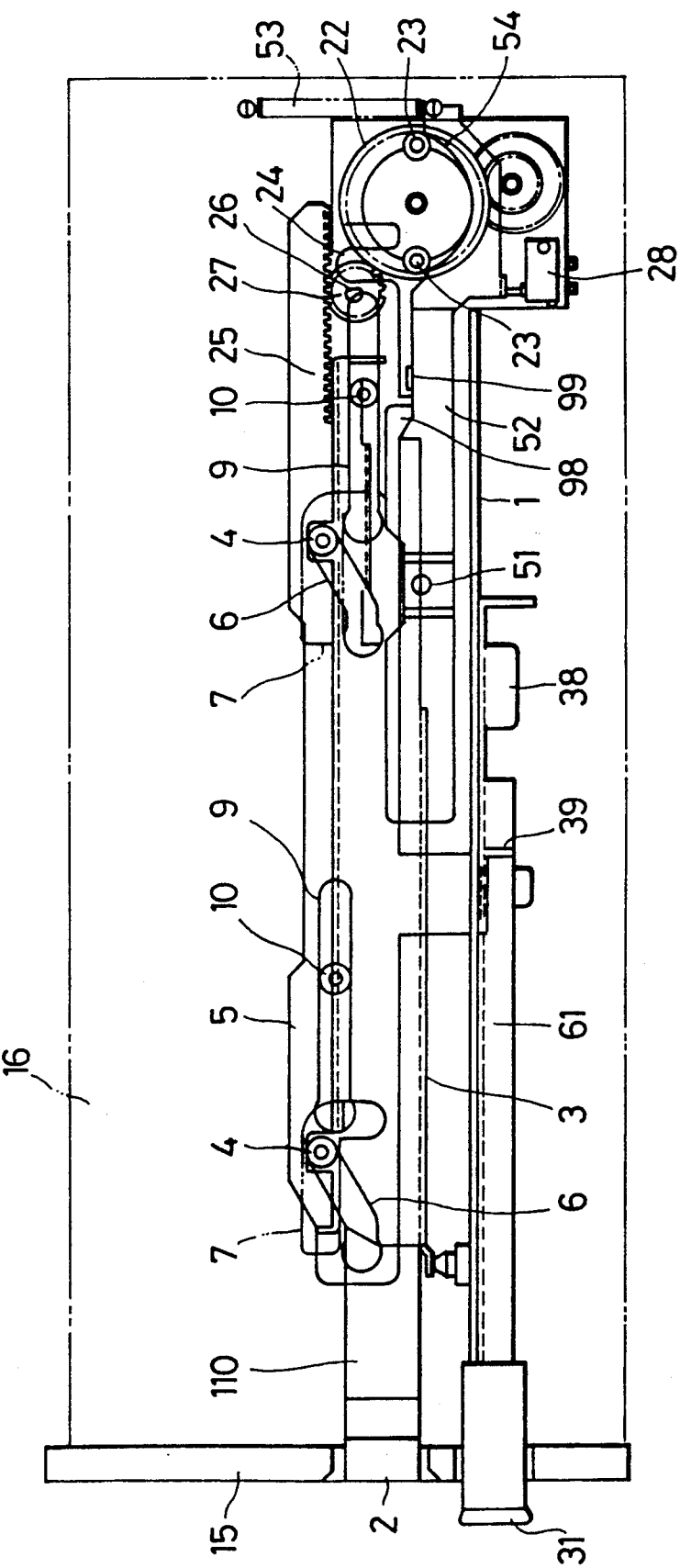
FIG. 22 is a right side view showing a loading apparatus according to this invention at the time of starting motor.
Figure 23:
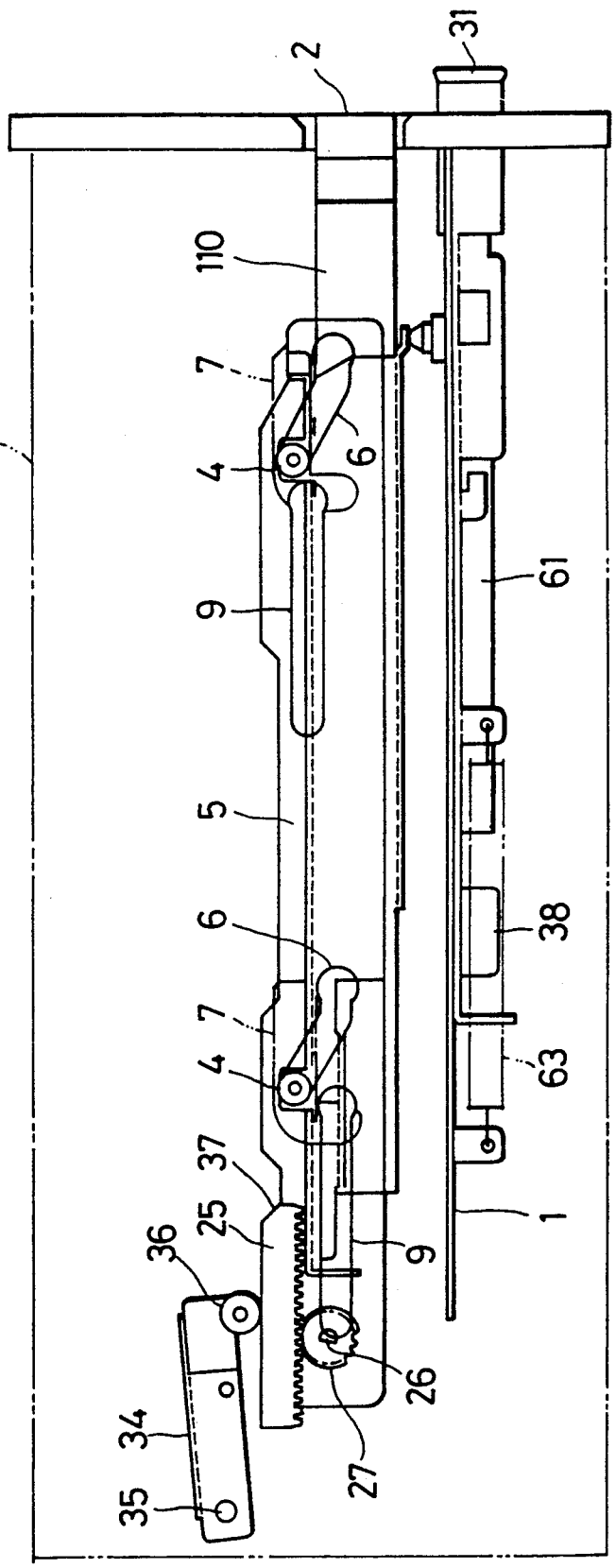
FIG. 23 is a left side view showing a loading apparatus according to this invention at the time of starting motor.
Figure 24:
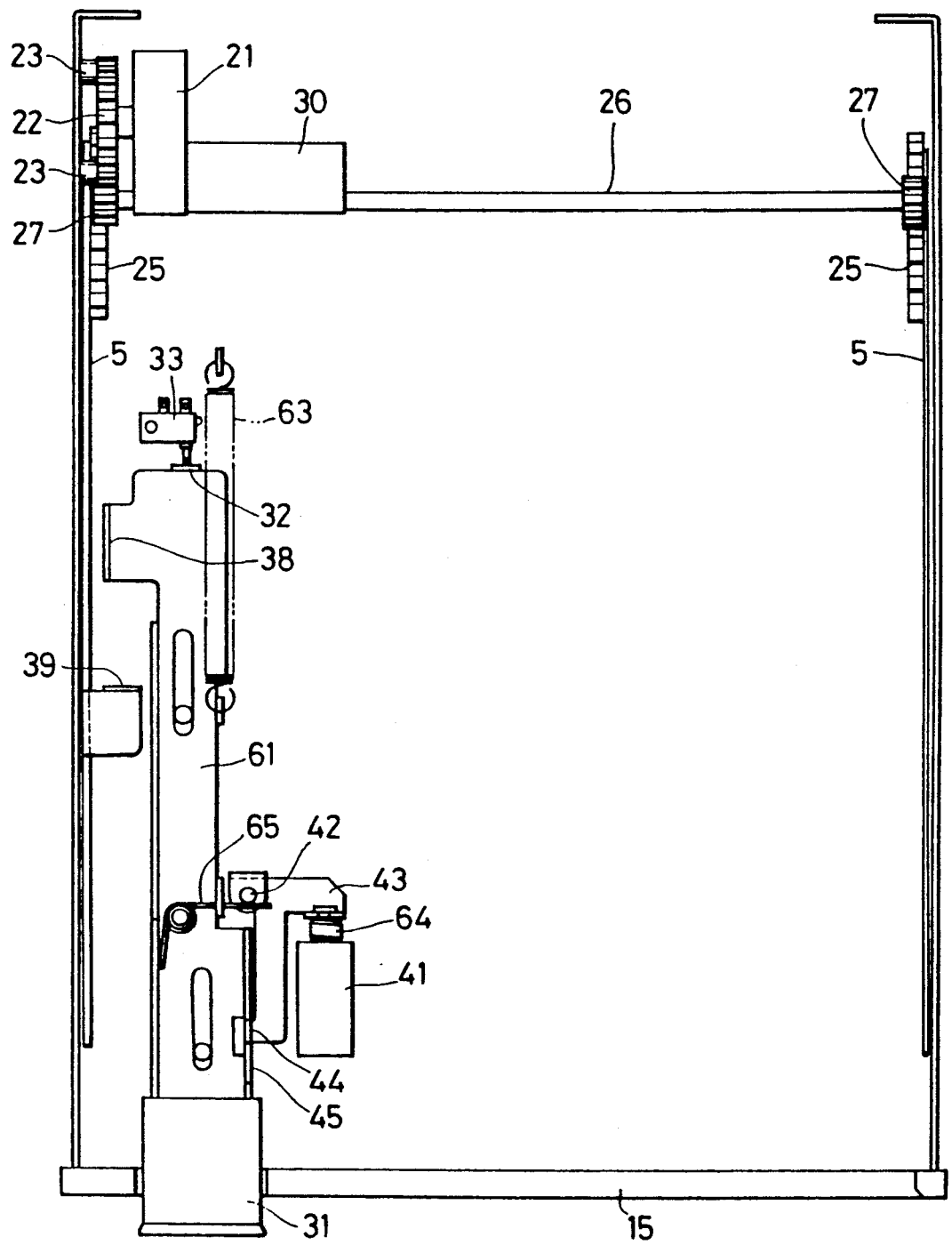
FIG. 24 is a bottom view showing a loading apparatus according to this invention at the time of starting motor.
Figure 25:
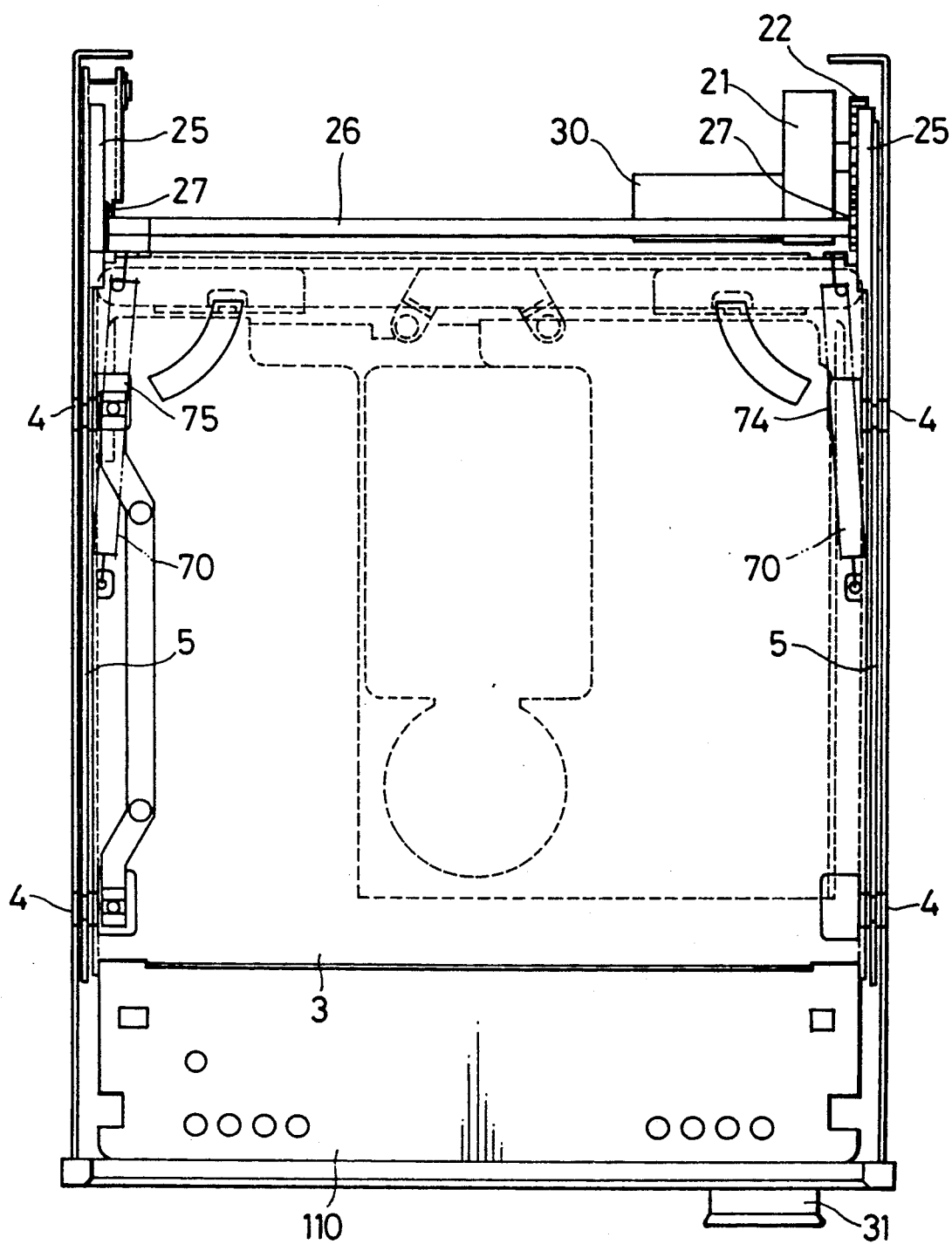
FIG. 25 is a plan view showing a loading apparatus according to this invention in the process of loading or unloading.

When the microswitch 89 is turned OFF, the holder 3 and the cam plate 5 reach the positions shown in FIGS. 21 to 24. At this time, as shown in FIG. 22, the stud 23 mounted on the gear 22 confronts the groove 24 of the cam plate 5. After the microswitch 8 has been turned off, when the microswitch 89 is turned off, the motor 30 is activated. As a result, since the gear 22 is rotated through the gear box 21 in a clockwise direction in FIG. 22, the left stud 23 is inserted in the groove 24 and the cam plate 5 is moved to the right. Therefore, even if the cartridge 110 is not pushed thereafter, the cartridge 110, holder 3 and cam plate 5 are moved right together and the process of loading is realized as shown in FIGS. 25 to 28.

Figure 26:
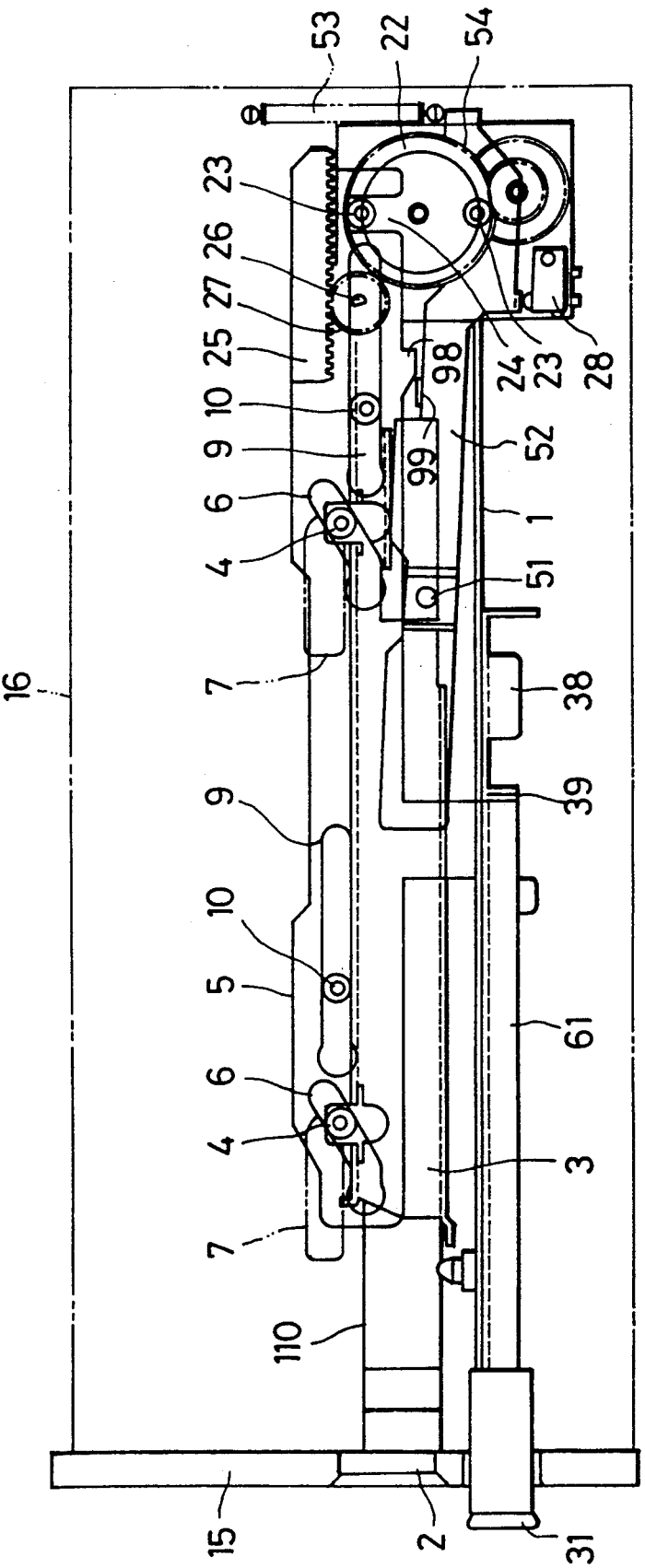
FIG. 26 is a right side view showing a loading apparatus according to this invention in the process of loading or unloading.
Figure 27:
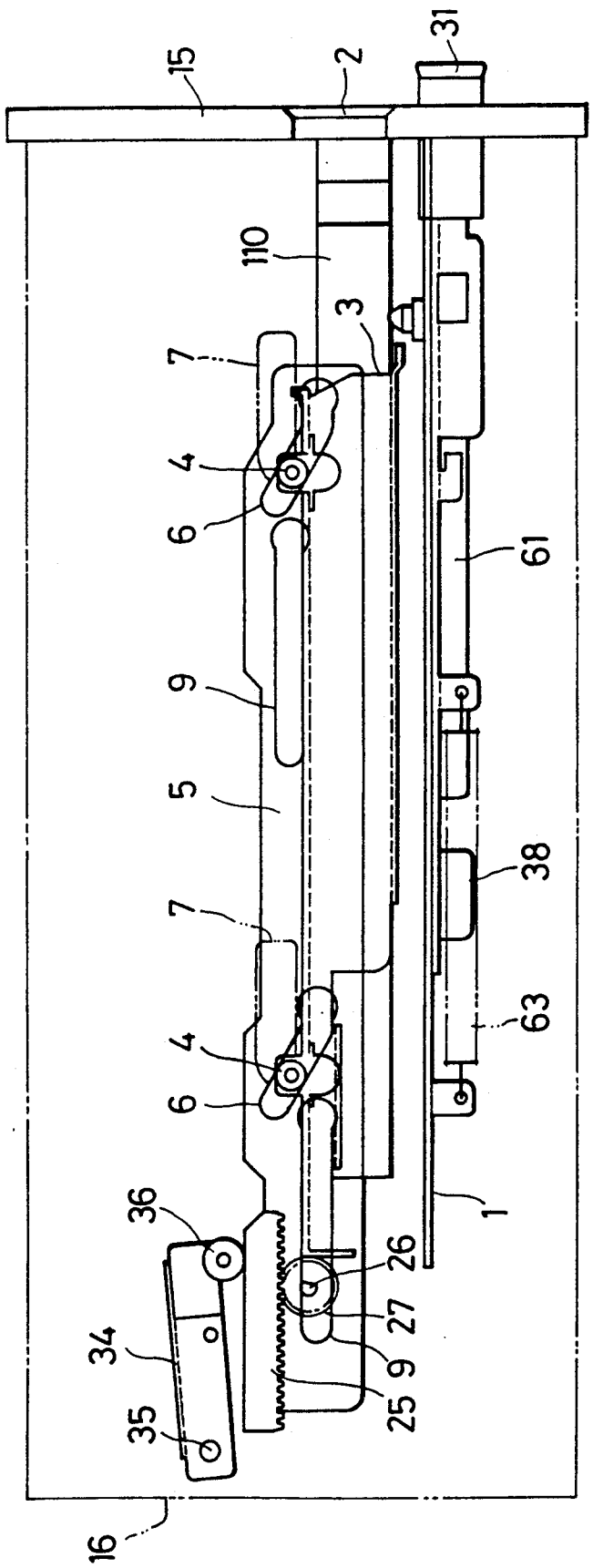
FIG. 27 is a left side view showing a loading apparatus according to this invention in the process of loading or unloading.
Figure 28:
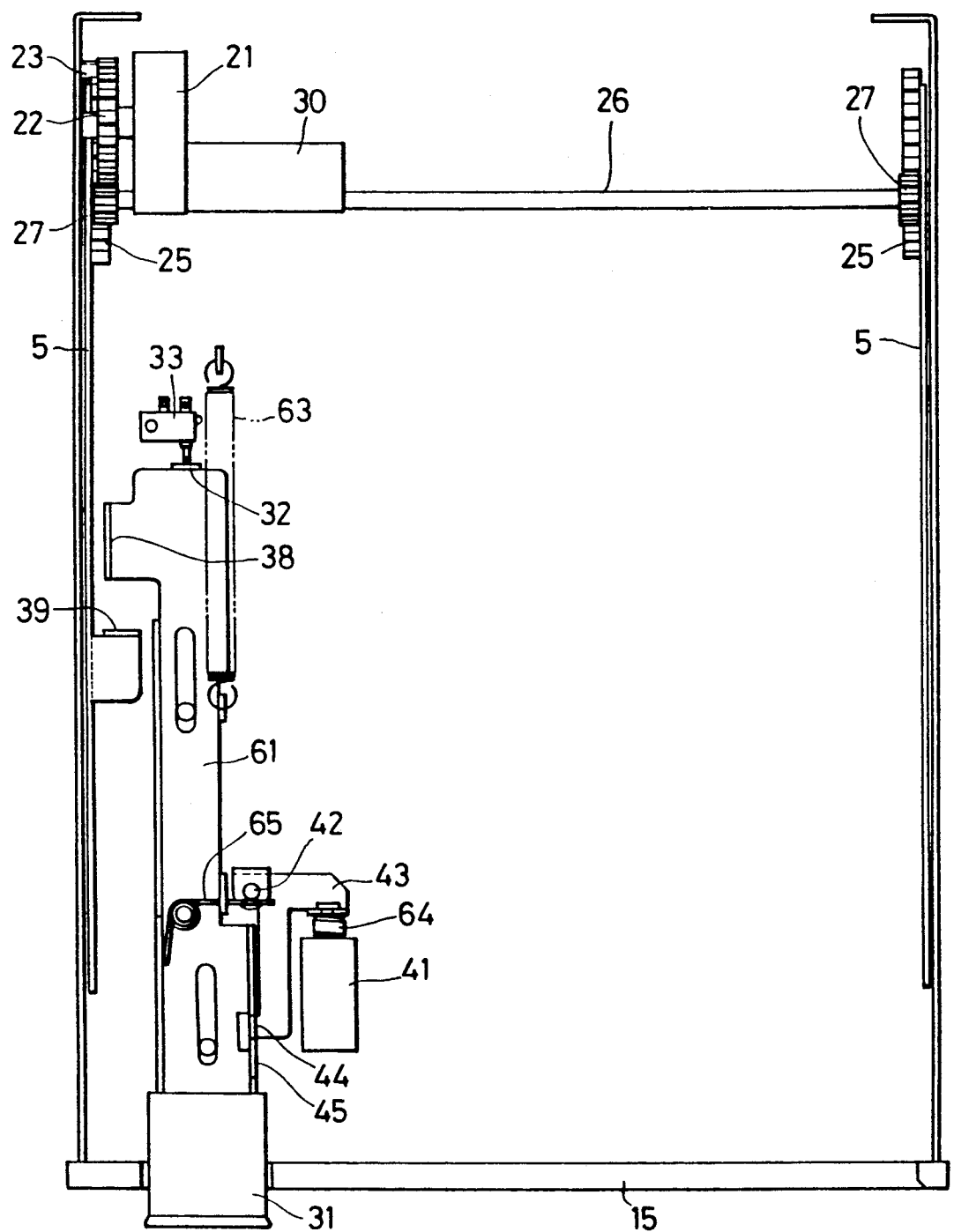
FIG. 28 is a bottom view showing a loading apparatus according to this invention in the process of loading or unloading.
Figure 29:
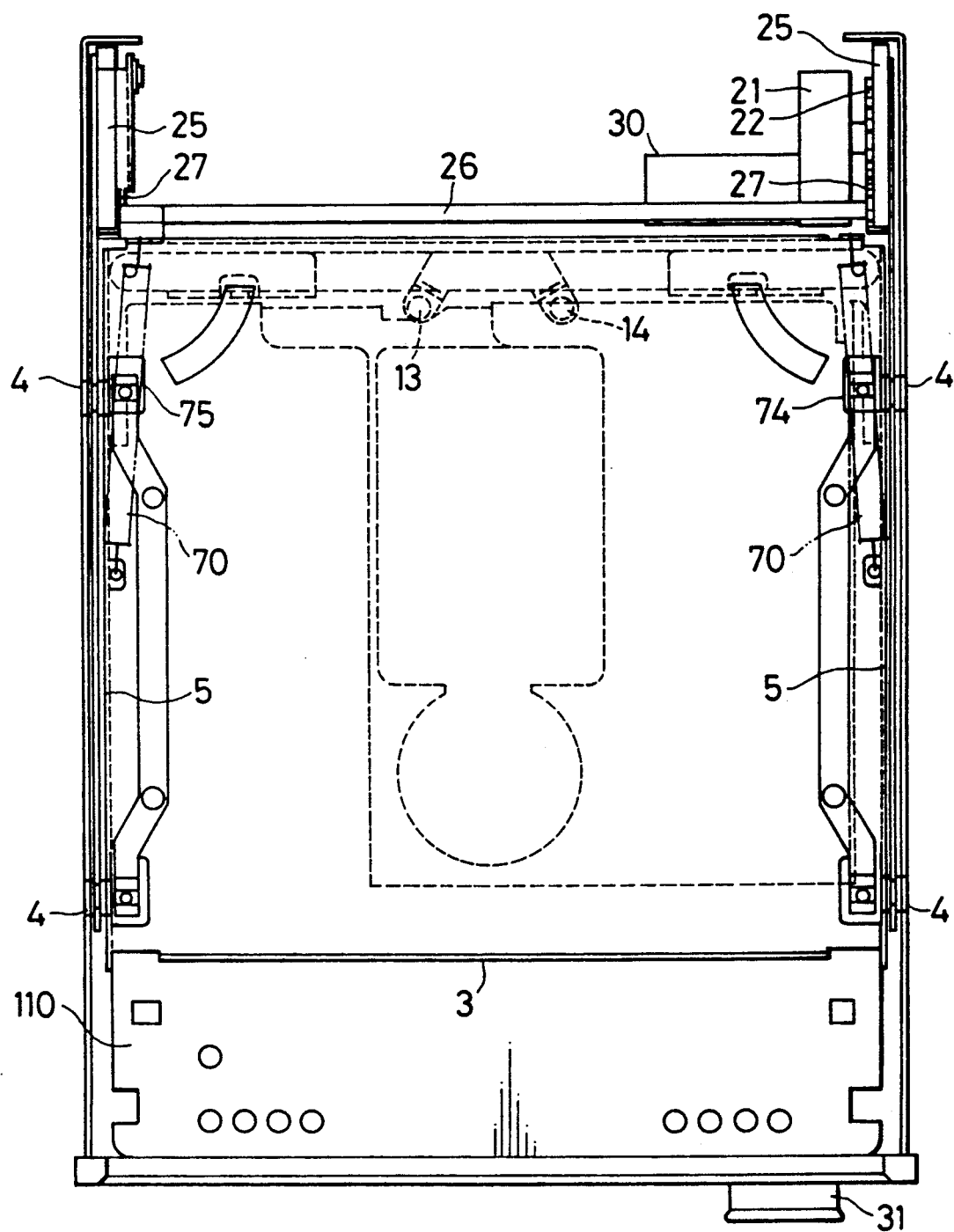
FIG. 29 is a plan view showing a loading apparatus according to this invention at the time of loading completion.
Figure 30:
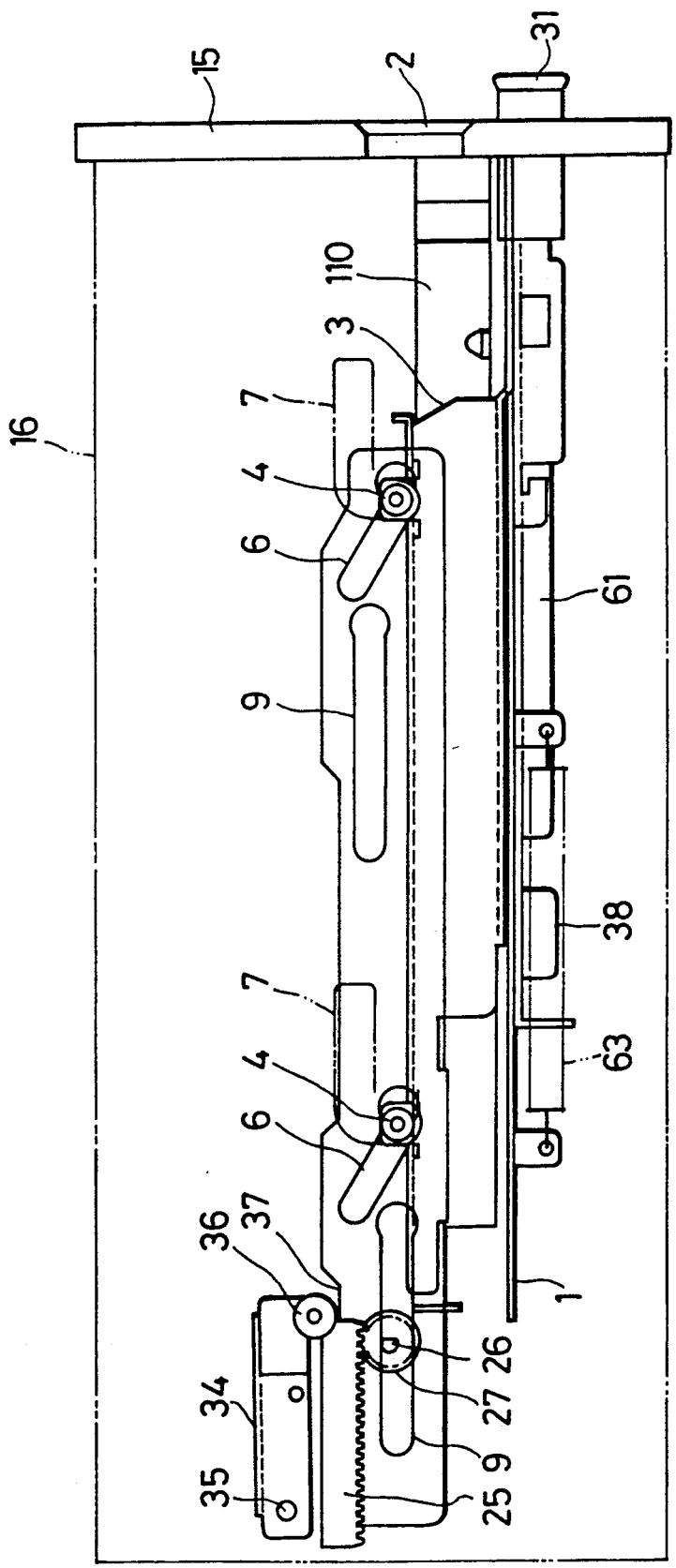
FIG. 30 is a left side view showing a loading apparatus according to this invention at the time of loading completion.

The cam plate 5 is guided by the stud 10 inserted in the linear slot 9 on the chassis 1 and moves thus linearly. Because the stud 4 mounted on the holder 3 is guided by the cam 7 formed on the side wall of the chassis 1 comprising a horizontal portion and vertical portion in a shape of a letter L, the holder 3 moves once in a horizontal direction and thereafter down in a vertical direction. Also, as shown in FIG. 26, as the gear 22 rotates in a clockwise direction, when the right stud 23 in FIG. 22 comes into contact with the recess 54 of the stopper 52, the stopper 52 is pivoted on the stud 51 in a clockwise direction. Thereby, because the projection 99 of the stopper 52 moves below more than the projection 98 of the cam plate 5, the cam plate 5 is permitted to move right in the figure and the microswitch 28 is turned ON by the stopper 52. After that, owing to further rotation of the gear 22, the stud 23 rotates and moves up and the stopper 52 rotates in a counterclockwise direction under the force of the spring 53. When the stud 23 reaches a specific position the microswitch 28 is turned OFF again. When the microswitch 25 is turned off the motor 30 is deactivated and the rotation of gear 22 is stopped. At this time the roller 36 on the end of arm 34 engages with the cam 37 according to the force of the spring 71 shown in FIG. 4, the cam plate 5 is locked and the states shown in FIGS. 1 and 29 to 31 are realized. Therefore, the cam plate 5 can not be returned in a right direction in FIG. 30. Thus at the time of completion of the loading, the optical disk enclosed in the cartridge 110 is clamped on a turntable (not shown) and is able to be rotated. Accordingly the information can be recorded and read by an optical head (not shown).

Figure 1:
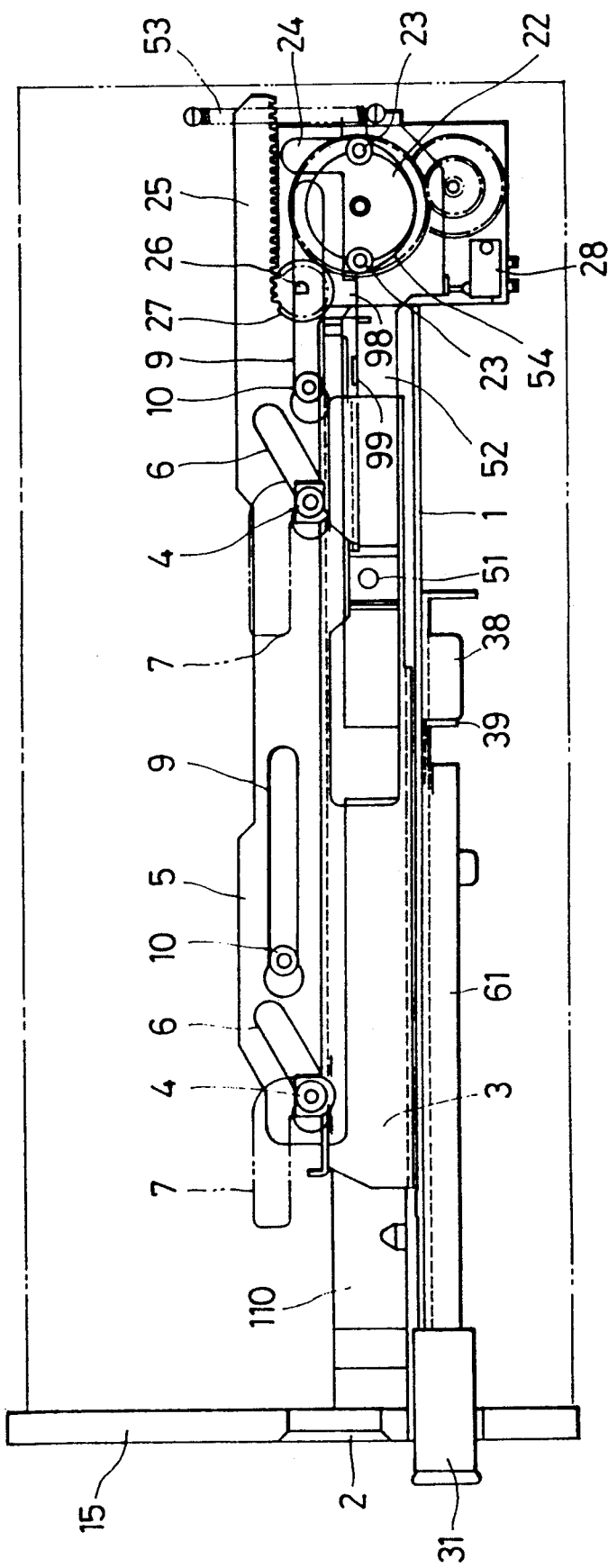
FIG. 1 is a right side view showing a loading apparatus according to this invention in a state of loading completion.
Figure 2:
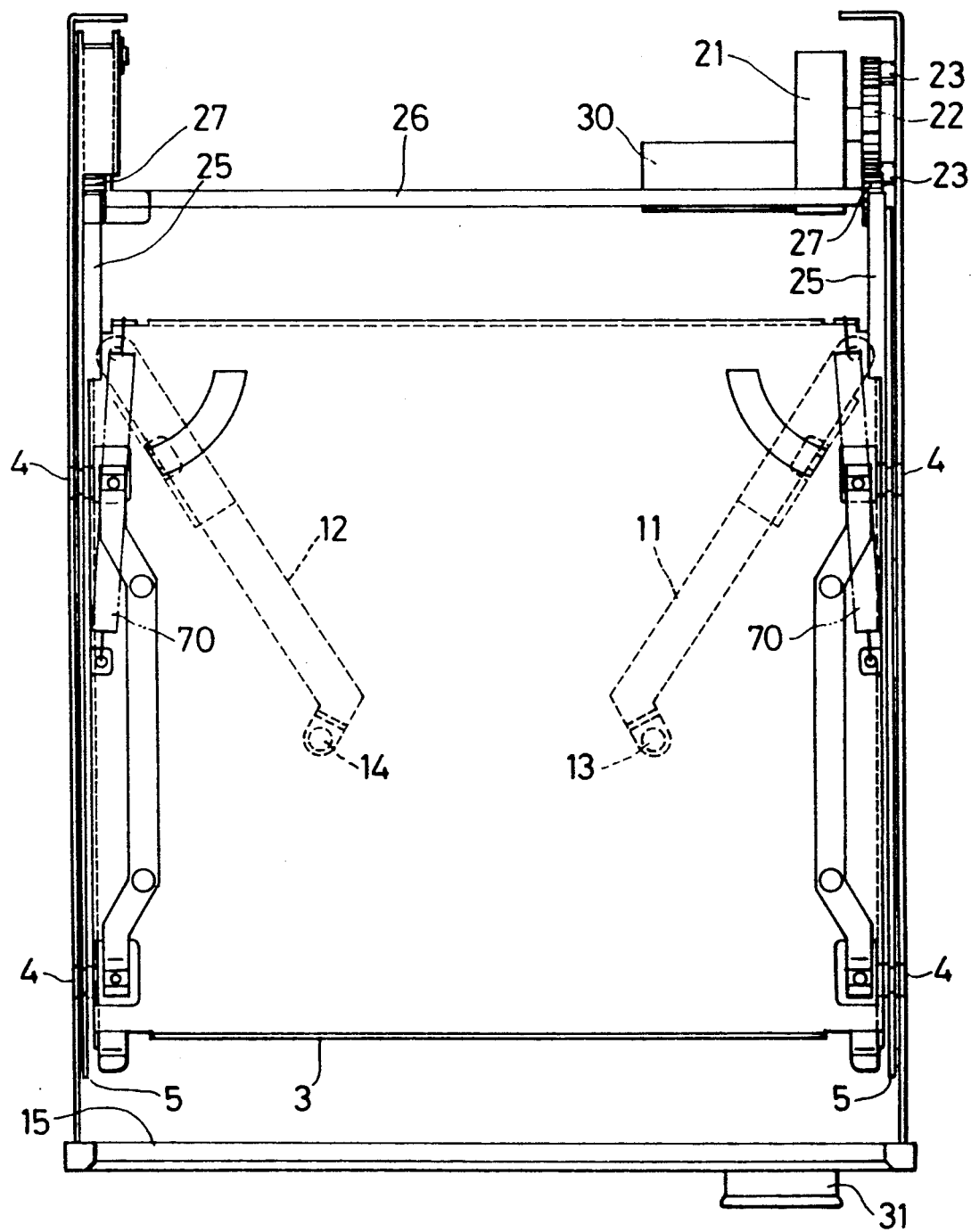
FIG. 2 is a plan view showing a loading apparatus according to this invention in a state of unloading.
Figure 3:
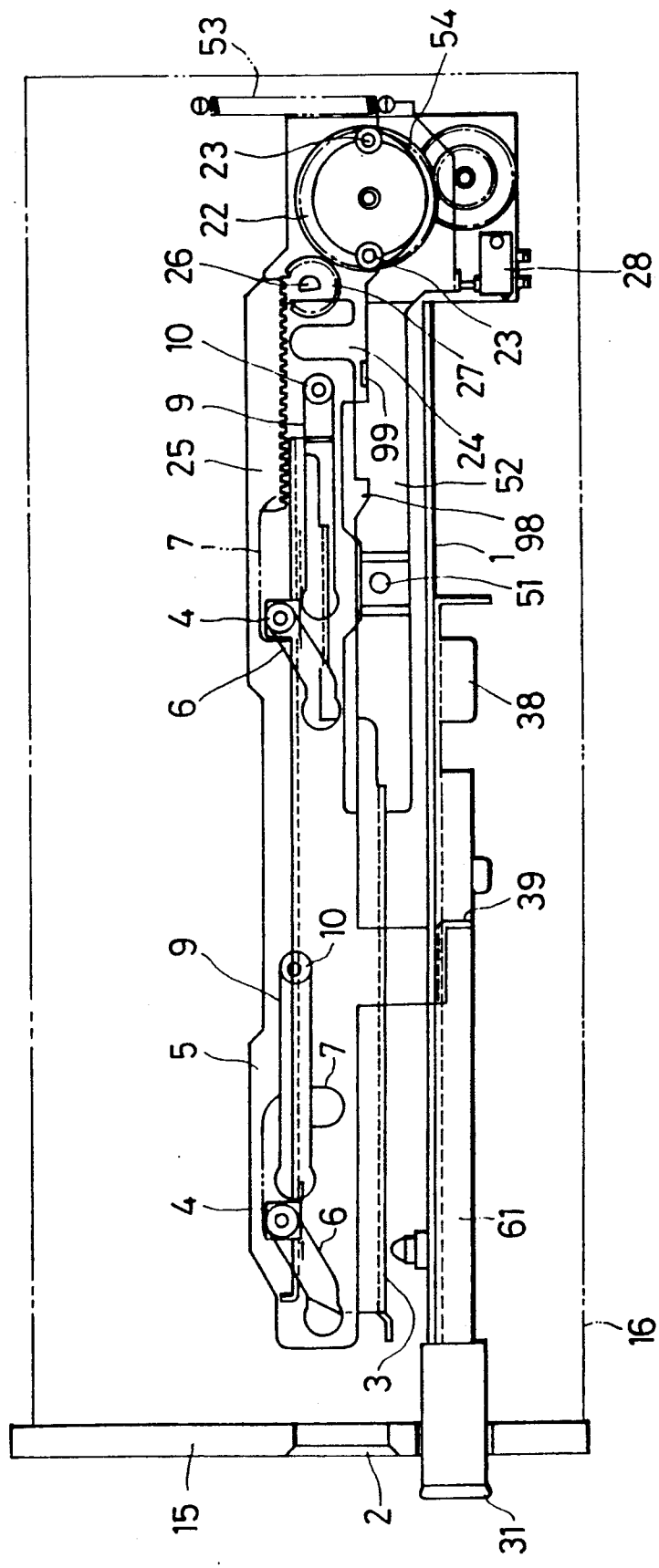
FIG. 3 is a right side view showing a loading apparatus according to this invention in a state where a cartridge is not inserted in the loading apparatus.

At the time of the loading completion, the stud 23 and groove 24 are in a relation shown in FIG. 1. Namely, the stud 23 is separated from the groove 24, thereby the rotation of gear 22 in a clockwise direction is not transmitted and the cam plate 5 is not prevented from moving left.

Figure 31:
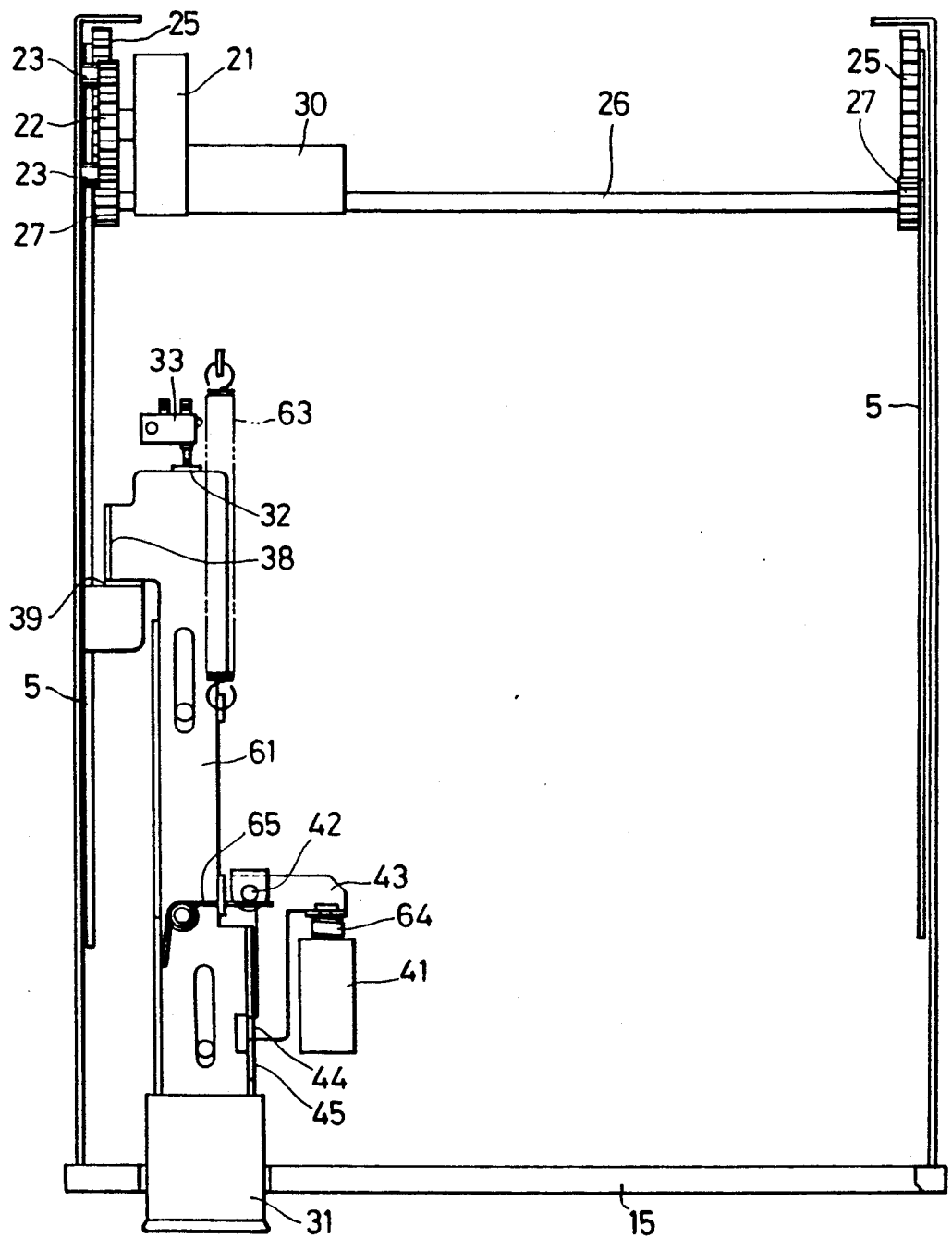
FIG. 31 is a bottom view showing a loading apparatus according to this invention at the time of loading completion.
Figure 32:
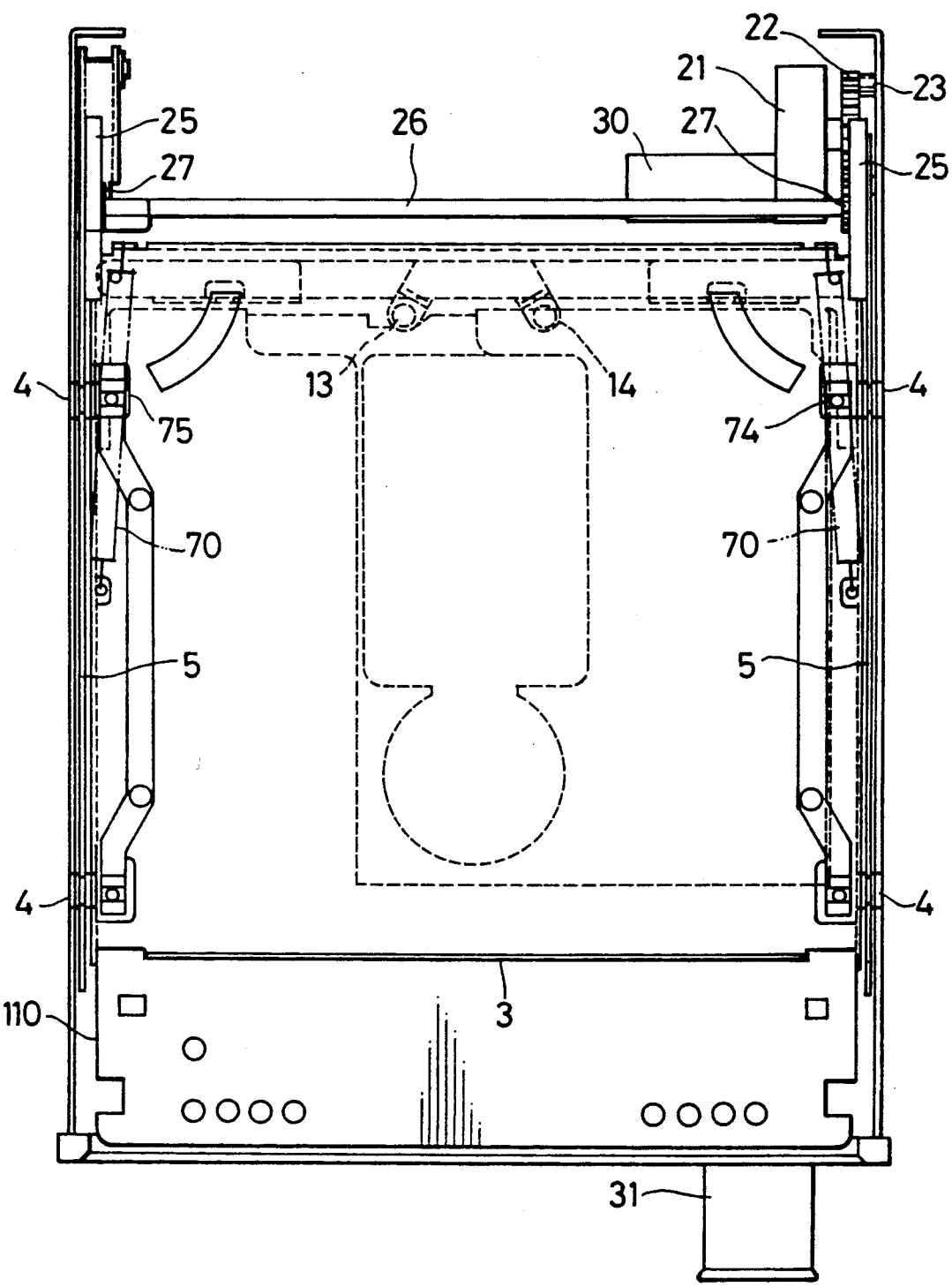
FIG. 32 is a plan view showing a loading apparatus according to this invention in a state of unloading by manual operation.
Figure 33:
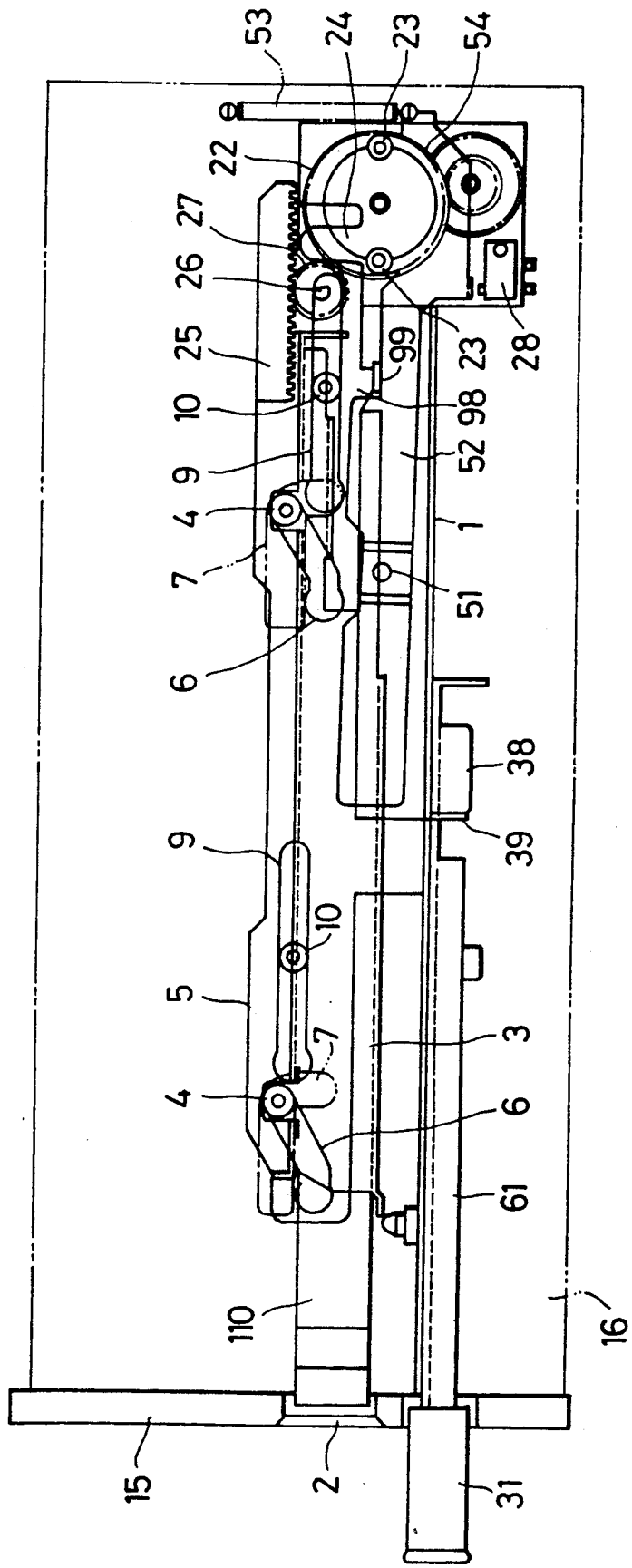
FIG. 33 is a right side view showing a loading apparatus according to this invention in a state of unloading by manual operation.
Figure 34:
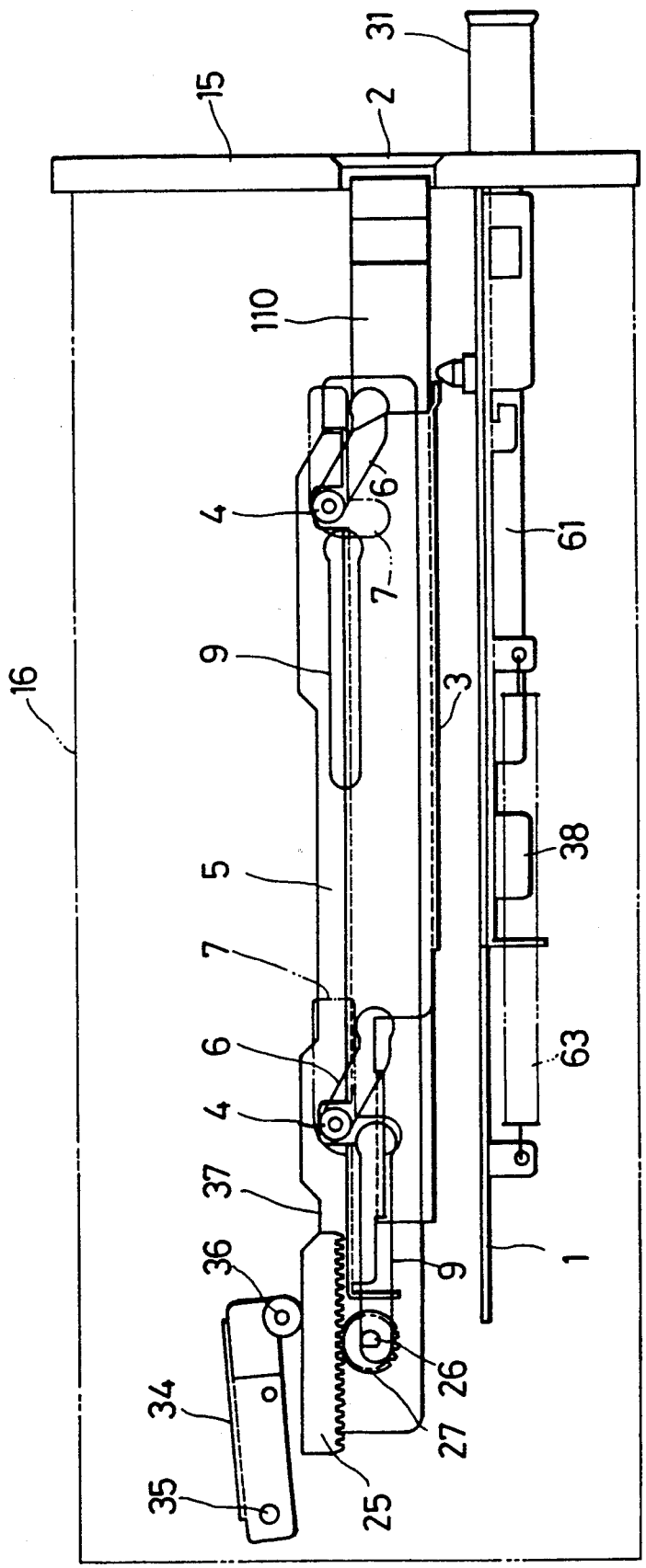
FIG. 34 is a left side view showing a loading apparatus according to this invention in a state of unloading by manual operation.
Figure 35:
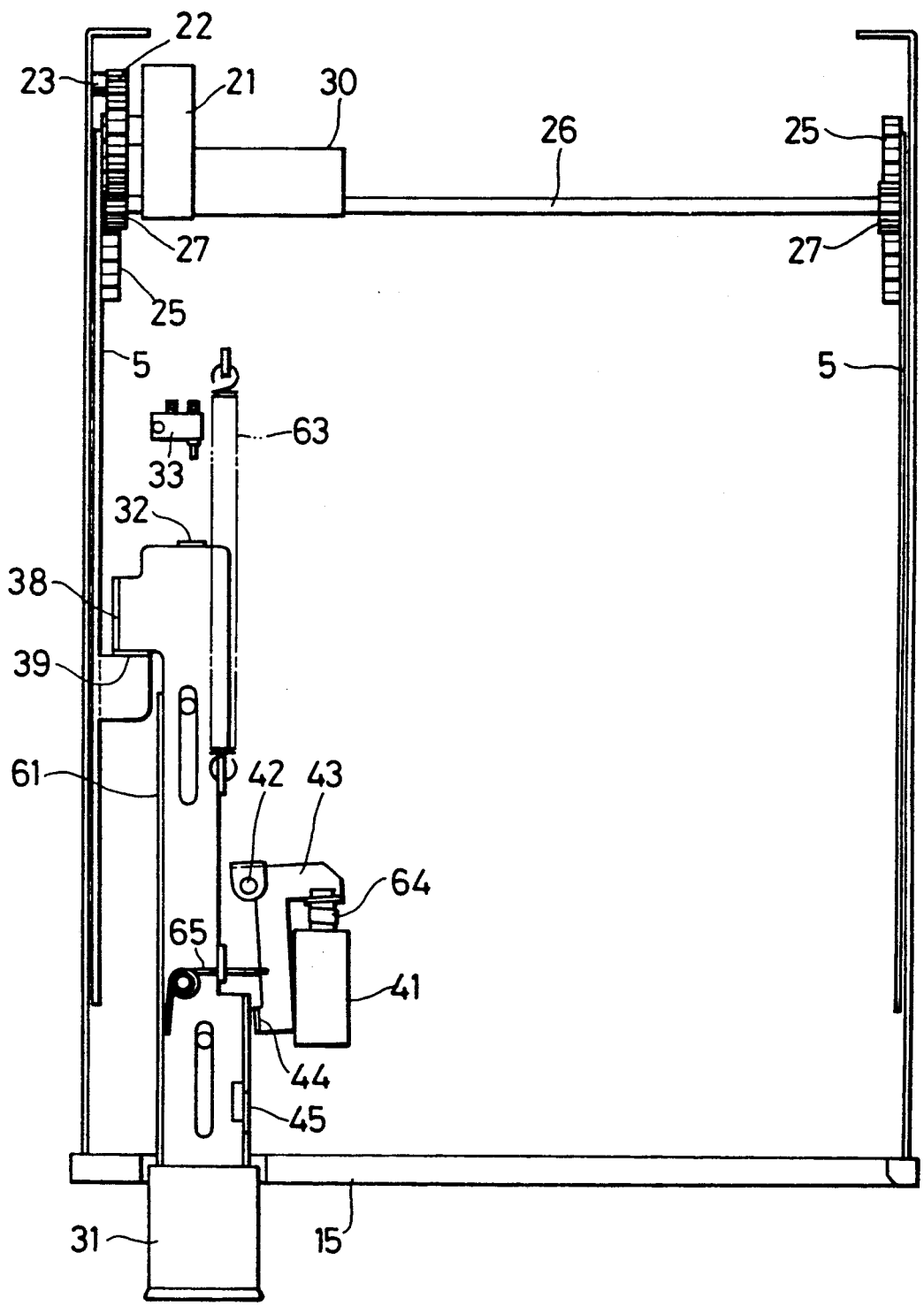
FIG. 35 is a bottom view showing a loading apparatus according to this invention in a state of unloading by manual operation.

Also, when the electric power is supplied in an apparatus, the plunger 41 is activated, so the arm 43 is pivoted on the stud 42 in a clockwise direction against the force of the spring 64 as shown in FIGS. 6 and 31. Accordingly, the projection 44 of the arm 43 is inserted in the notch 45 of the plate 61, so that the plate 61 can not be moved downward. At the time of the stoppage of the electric power supply, however, as shown in FIG. 35, the plunger 41 is deactivated, the projection 44 is located outside of the notch 45 owing to the rotation of arm 43 by the force of the spring 64 in a counterclockwise direction, and the plate 61 can be moved downward.

Therefore, when the motor 30 can not be driven due to the stoppage of the electric power supply for instance while the cartridge 110 is located in a recording and playback position (position shown in FIGS. 1 and 29 to 31), the eject button 31 can be pulled downward in FIG. 31 (left in FIG. 1). At this time, because the projection 38 of the plate 61 comes in contact with the projection 39 of the cam plate 5, when the plate 61 moves downward against the force of the spring 63, the cam plate 5 also moves downward and the states shown in FIGS. 32 to 35 are realized. Since the front edge of projection 98 of the cam plate 5 is tapered, the projection 98 is not stopped with the projection 99 of the stopper 52 and the cam plate 5 can move left in FIG. 1. Thus manual unloading is performed. When the pulling force is released, the eject button 31 is returned to its original position by the force of the spring 63.

In order to perform the unloading in a state that the electric power is supplied, the eject button 31 is pushed upward in FIG. 31. Namely, in this invention, the operating means for unloading is shared by the manual, and the automatic operations. Thereby, ease of operation, reduction of space and a compact apparatus can be achieved.

When the eject button 31 is pushed in an upward direction, the plate 61 moves upward against the force of the spring 65 and the pressure portion 32 presses the microswitch 33 and turns it ON. When released, the eject button 31 is returned to the original position by the force of the spring 65. Since the movement of the plate 61 in a downward direction is for making the cam plate 5 move manually in a downward direction, the stroke thereof needs a length in compliance with moving distance of the cam plate 5. On the contrary, the movement of the plate 61 in an upward direction is for making the microswitch 33 turn ON, so the stroke thereof can be short. When the microswitch 33 is turned ON, the motor 30 for loading (unloading) is activated so that a current flows in a reverse direction and the gear 22 is rotated in a direction reverse to that mentioned above. When the gear 22 is rotated in the reverse direction in FIG. 1, the right stud 23 is inserted in the groove 24. As a result, the cam plate 5 is pushed by the stud 23 and moves left.

When the cam plate 5 moves left, the holder 3 moves upward because the stud 4 on the holder 3 is pressed by the slant cam 6 on the cam plate 5 and guided by the vertical groove of the cam 7. Furthermore, the stud 4 is shifted to and is guided by the horizontal groove of the cam 7 and the holder 3 moves left. When the holder 3 moves right in FIG. 20 (left in FIG. 1), the plate 88 pulled by the spring 93 in a right direction and moves to the right together with the holder 3 in a state that the left end of slot 92 is engaged with the stud 87. At the time of reaching a specific position, the plate 88 comes in contact with the microswitch 89 and makes turns it ON. When the stopper 52 rotates in a counterclockwise direction in association with the rotation of the stud 23 from the position shown in FIG. 26 to that shown in FIG. 22 and the microswitch 28 is turned OFF, the motor 30 is deactivated. Hereafter, therefore, the holder 3 moves further according to the force of the spring 70. The plate 88 which is in contact with the microswitch 89 stops there but the further movement of the holder 3 is permitted because the stud 87 on the holder 3 is inserted in the slot 92 formed on the plate 88.

Figure 17:
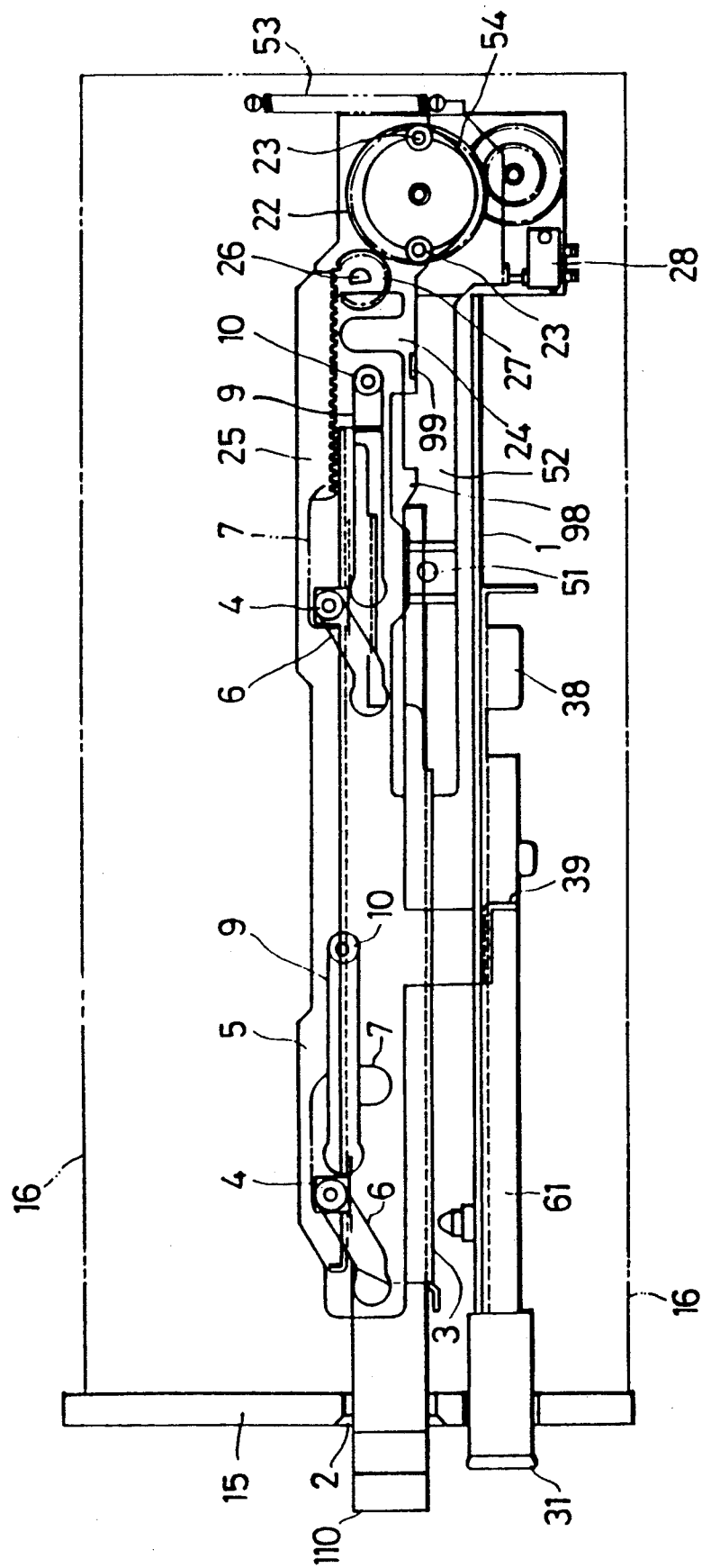
FIG. 17 is a right side view showing a loading apparatus according to this invention in a state where a cartridge is set.
Figure 18:
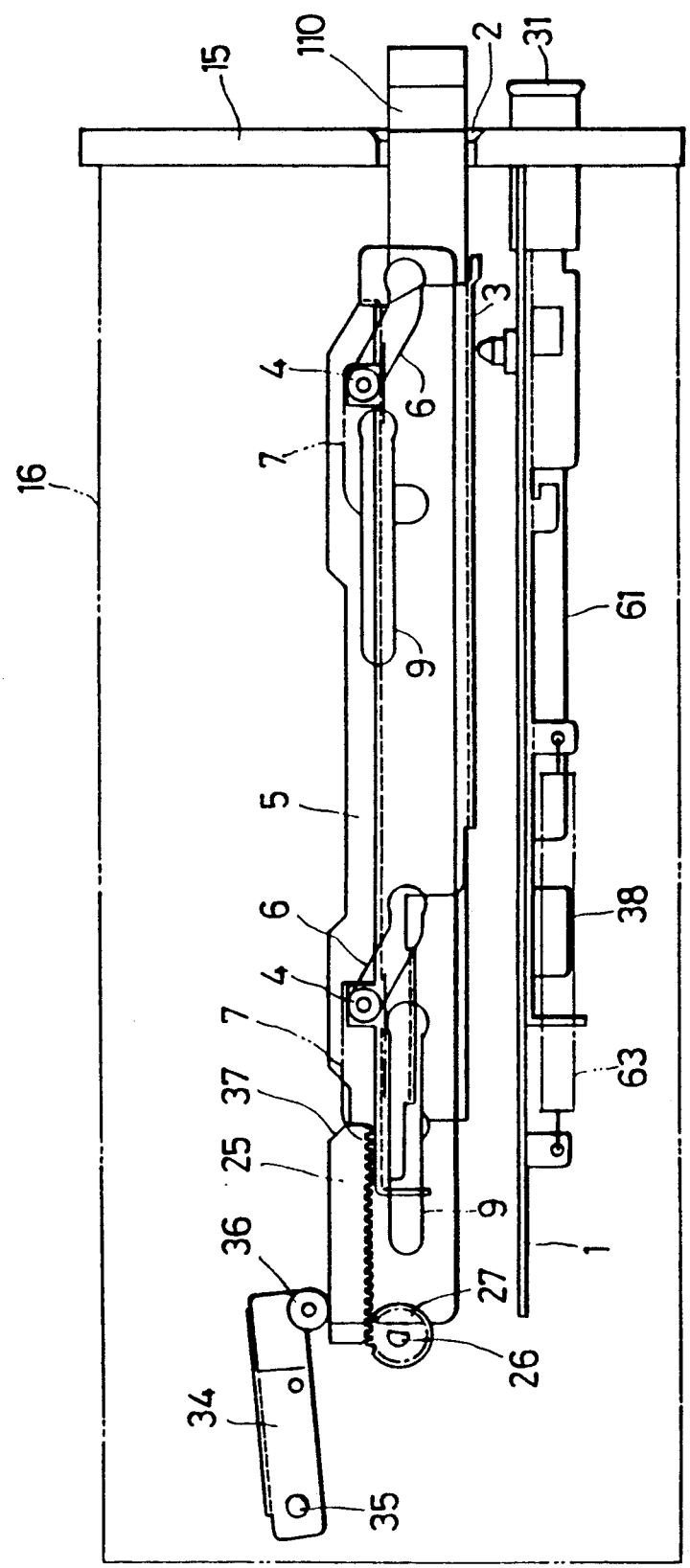
FIG. 18 is a left side view showing a loading apparatus according to this invention in a state where a cartridge is set.

The holder 3 stops in a position where the stud 4 comes in contact with the left end of cam 7 in FIG. 17. Thus the eject state shown in FIGS. 15 to 18 is realized.

When the cartridge 110 is pulled downward by hand in a state shown in FIG. 16, the cartridge lock arms 74 and 75 pulled by the springs 76 and 77 are pressed by the grooves 115 of the cartridge 110 and rotates a little in an outward direction and the lock is removed. By further pulling of the cartridge 110, the arms 11 and 12 project in a forward direction according to the force of the springs 76 and 77. At the same time the shutter 112 of the cartridge 110 closes the opening 113 in compliance with a force of a enclosed spring (not shown). When the cartridge 110 is taken out from the holder 3, because the pressure on the roller 84 is removed, the holder lock arm 81 rotates by the force of the spring 83 in a clockwise direction in FIG. 20. As a result the projection 85 is interlocked with the projection 86 and the holder 3 is locked on the chassis 1. Since the front edge of projection 85 is tapered, even if a cartridge is not set for example at the time of assembly of an apparatus and so on and the holder lock arm 81 is kept in a state that it has been rotated in a clockwise direction, the holder 3 can be returned from the recording and playback position to the setting position because the tapered portion of the projection 85 climbs over the projection 86. Thus the cartridge 110 is taken out from the apparatus and unloading is completed.

In the above embodiment, the cartridge storing the disk is loaded and unloaded. However, this invention can be applied to the loading and unloading of a recording medium irrespective of whether the recording medium comprises the disk itself or the cartridge.

What is claimed is:

1. A loading apparatus comprising:
   moving means for moving a recording medium between an unloaded position and a loaded position to load and unload said recording medium;
   a motor for being activated and rotated to load and unload said recording medium by driving said moving means;
   manual operating means for being manually operated to move from an original position, to move said moving means from said loaded position to said unloaded position for unloading said recording medium at least when electric power is not being supplied; and
   transmission means for transmitting motor rotation for loading and unloading to said moving means and for automatically inhibiting said transmission of said motor rotation when said moving means is in said loaded position so as to permit movement of said moving means by said manual operating means without affecting rotation of said motor.

2. A loading apparatus according to claim 1, wherein said manual operating means is also operated to initiate an unloading operation when unloading is effected by said motor.

3. A loading apparatus according to claim 2, wherein said loading apparatus further comprises means for inhibiting operation of said manual operating means to move said moving means to said unloaded position when unloading is performed by said motor.

4. A loading apparatus according to claim 3, wherein said means for inhibiting unloading comprises:
   a plunger which is activated when electric power is supplied; and
   an arm which is driven by said plunger to engage with said manual operating means to inhibit said manual operation of said manual operating means.

5. A loading apparatus according to claim 2, wherein said manual operating means is operated by being moved in different directions for said manual unloading and for said motor unloading.

6. A loading apparatus according to claim 5, wherein said manual operating means is pulled for manual unloading by a distance longer than for said motor loading and pushed for said motor unloading by a distance shorter than for said manual unloading.

7. A loading apparatus according claim 5, wherein said loading apparatus further comprises two springs for biasing said manual operating means to return to said original position after operation of said manual operating means.

8. A loading apparatus according to claim 2, wherein said loading apparatus further comprises a microswitch positioned for detecting operation of said manual operating means, and operative for activating said motor for said motor unloading.

9. A loading apparatus according to claim 1, wherein said moving means comprises a holder for holding said recording medium and said transmission means comprises a cam plate including a groove and a gear, said gear is rotated by said motor and has a first stud engageable with said groove.

10. A loading apparatus according to claim 9, wherein said gear has a second stud, said loading apparatus further comprises a stopper which has a first projection engageable with said cam plate to prohibit said cam plate from moving when said recording medium is not set properly in said loading apparatus, said gear is rotated by said second stud so that said cam plate is permitted to move when said recording medium is set properly in said loading apparatus.

11. A loading apparatus according to claim 10, wherein said cam plate has a second projection engageable with said first projection and one edge of said second projection is tapered so that said cam plate can be moved at the time of said manual unloading.

* * * * *

UNITED STATES PATENT AND TRADEMARK OFFICE
CERTIFICATE OF CORRECTION

PATENT NO. : 5,126,899
DATED : June 30, 1992
INVENTOR(S) : Hiroshi KANAZAWA

It is certified that error appears in the above-indentified patent and that said Letters Patent is hereby corrected as shown below:

At column 8, line 67 (claim 7, line 1), insert ---to--- after "according".

Signed and Sealed this

Nineteenth Day of September, 1995

Attest:

BRUCE LEHMAN

*Attesting Officer*    *Commissioner of Patents and Trademarks*